(12) United States Patent
Koch et al.

(10) Patent No.: US 11,555,945 B2
(45) Date of Patent: Jan. 17, 2023

(54) SYSTEMS, METHODS, AND DEVICES FOR MONITORING WEATHER AND FIELD CONDITIONS

(71) Applicant: CLIMATE LLC, San Francisco, CA (US)

(72) Inventors: Dale Koch, Tremont, IL (US); Todd Swanson, Morton, IL (US); Justin Koch, Morton, IL (US)

(73) Assignee: CLIMATE LLC, San Francisco, CA (US)

(*) Notice: Subject to any disclaimer, the term of this patent is extended or adjusted under 35 U.S.C. 154(b) by 116 days.

(21) Appl. No.: 17/010,471

(22) Filed: Sep. 2, 2020

(65) Prior Publication Data
US 2021/0003743 A1 Jan. 7, 2021

Related U.S. Application Data

(63) Continuation of application No. 15/551,582, filed as application No. PCT/US2016/029609 on Apr. 27, 2016, now Pat. No. 10,768,340.
(Continued)

(51) Int. Cl.
G01W 1/02 (2006.01)
G01W 1/14 (2006.01)
G01F 3/00 (2006.01)

(52) U.S. Cl.
CPC ............... G01W 1/02 (2013.01); G01W 1/14 (2013.01); G01F 3/00 (2013.01)

(58) Field of Classification Search
USPC .......................................................... 702/3
See application file for complete search history.

(56) References Cited

U.S. PATENT DOCUMENTS 3,989,066 A 11/1976 Sturman et al.
4,018,362 A * 4/1977 Ubaud ............... A61M 5/1689
128/DIG. 13
(Continued)

FOREIGN PATENT DOCUMENTS

CN 201280424 7/2009
JP S63-132153 6/1988
(Continued)

OTHER PUBLICATIONS

Koch, U.S. Appl. No. 15/551,852, filed Aug. 16, 2017, Office Action, dated Apr. 9, 2020.
(Continued)

Primary Examiner — Paul D Lee
(74) Attorney, Agent, or Firm — Harness, Dickey & Pierce, P.L.C.

(57) ABSTRACT

Described herein are systems and method for monitoring weather conditions and controlling field operations based on the weather conditions. In one embodiment, a system for monitoring weather conditions for field operations includes a plurality of weather devices for monitoring weather conditions of fields with at least at one weather device in proximity to each field being monitored and at least one weather device having an electronics module for determining weather data including precipitation data. The system also includes an agricultural computer system having at least one processing unit for executing instructions for monitoring weather conditions. The at least one processing unit is configured to execute instructions to receive weather data from the plurality of weather devices for monitoring weather conditions of fields, to process the weather data, and to generate data including precipitation rate for monitoring weather conditions and operations of the plurality of weather devices.

16 Claims, 21 Drawing Sheets

Related U.S. Application Data

(60) Provisional application No. 62/220,852, filed on Sep. 18, 2015, provisional application No. 62/798,060, filed on Jul. 28, 2015, provisional application No. 62/175,160, filed on Jun. 12, 2015, provisional application No. 62/154,207, filed on Apr. 29, 2015.

(56) References Cited

U.S. PATENT DOCUMENTS

| | | | |
|---|---|---|---|
| 4,302,969 | A | 12/1981 | Tavoni |
| 4,520,667 | A | 6/1985 | Nelson |
| 4,827,766 | A | 5/1989 | Nelson |
| 5,920,827 | A | 7/1999 | Baer et al. |
| 5,943,630 | A | 8/1999 | Busby et al. |
| 6,141,614 | A | 10/2000 | Janzen et al. |
| 6,151,614 | A | 10/2000 | Janzen et al. |
| 6,343,255 | B1 | 1/2002 | Peek |
| 8,573,049 | B1 | 11/2013 | Ware |
| 9,076,118 | B1 | 7/2015 | Mewes |
| 9,784,887 | B1 * | 10/2017 | Ulmer ............... B64D 1/08 |
| 10,768,340 | B2 | 9/2020 | Koch et al. |
| 2008/0184788 | A1 | 8/2008 | Jeong |
| 2009/0271044 | A1 | 10/2009 | Venkataramu |
| 2011/0046899 | A1 | 2/2011 | Paz |
| 2012/0109614 | A1 | 5/2012 | Lindores |
| 2016/0208540 | A1 | 7/2016 | Matsui |

FOREIGN PATENT DOCUMENTS

| | | |
|---|---|---|
| JP | 2004-144609 | 5/2004 |
| JP | 2005-214888 | 8/2005 |
| SU | 881646 | 11/1981 |
| UA | 20891 | 2/2007 |
| UA | 98817 | 12/2015 |

OTHER PUBLICATIONS

Koch, U.S. Appl. No. 15/551,582, filed Aug. 16, 2017, Notice of Allowance, dated May 18, 2020.
European Patent Office, "Search Report", in application No. 18841655.6-1014, dated Jun. 24, 2021, 1 page.
Current Claims, in Argentina application No. 20160101231, dated Apr. 19, 2021, 2 pages.
Current Claims in Canada application No. 2,984,251, dated Apr. 14, 2021, 2 pages.
Canadian Patent Office, "Examiner's Requisition", in application No. 2984251, dated Apr. 14, 2021, 4 pages.
Argentina Patent Office, "Office Action", in application No. 20160101231, dated Apr. 19, 2021, 6 pages.
The International Bureau, "Preliminary Report of the Patentability" in application No. PCT/US2016/029609, dated Nov. 16, 2017, 12 pages.
International Searching Authority, "Search Report", in application No. PCT/US16/29609, dated Sep. 26, 2016, 15 pages.
European Patent Office, "Search Report" in application No. 16787088.0-1001, dated Mar. 20, 2019, 9 pages.
European Claims in application No. 16787088.0-1001, dated Mar. 2019, 3 pages.
Current Claims in application No. PCT/US2016/029609, dated Nov. 2017, 4 pages.
Current Claims in application No. PCT/US16/29609, dated Sep. 2016, 4 pages.
Australian Patent Office, "Search Report" in application No. 2016255777, dated Jul. 9, 2020, 4 pages.
Australian Claims in application No. 2016255777, dated Jul. 2020, 4 pages.
U.S. Appl. No. 15/551,582, filed Aug. 16, 2017, Koch et al.
U.S. Appl. No. 15/551,582: (a) Office Action dated Apr. 9, 2020; and (b) Notice of Allowance dated May 18, 2020. The instant application is a continuation of U.S. Appl. No. 15/551,582.
EP 16787088.0: (a) Search Report dated Mar. 20, 2019; and (b) Decision to Grant dated Sep. 3, 2020. EP 16787088.0 has a common priority claim with the instant application.
AU 2016255777: (a) Search Report dated Jul. 9, 2020; (b) Notice of Acceptance dated Jan. 6, 2021; and (c) Notice of Grant dated May 6, 2021. AU2016255777 has a common priority claim with the instant application.
UA 201712152: Decision to Grant dated Nov. 24, 2021. UA201712152 has a common priority claim with the instant application.
PCT/US2016/029609: International Search Report and Written Opinion dated Sep. 26, 2016. The instant application has a priority claim related to PCT/US2016/029609.
CA 2,984,251: (a) Office action dated Nov. 15, 2021. CA 2,984,251 has a common priority claim with the instant application.
EP 20194547.4: (a) Search Report dated Jun. 28, 2021. EP 20194547.4 has a common priority claim with the instant application.

\* cited by examiner

Fig. 2
(a)
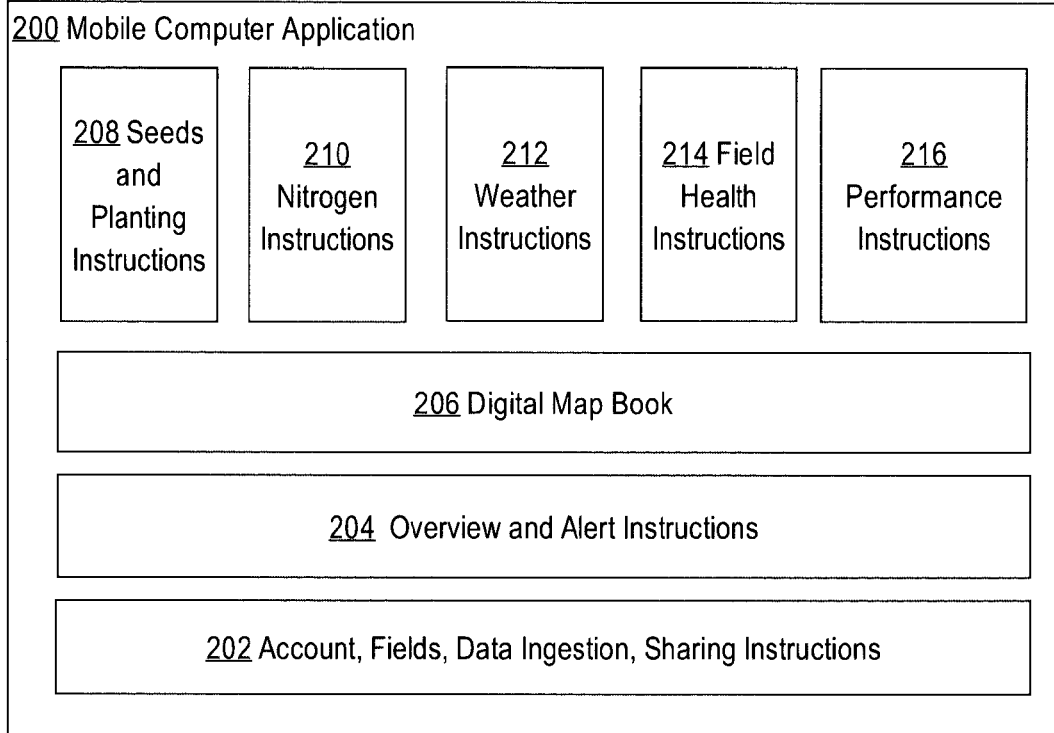
(b)
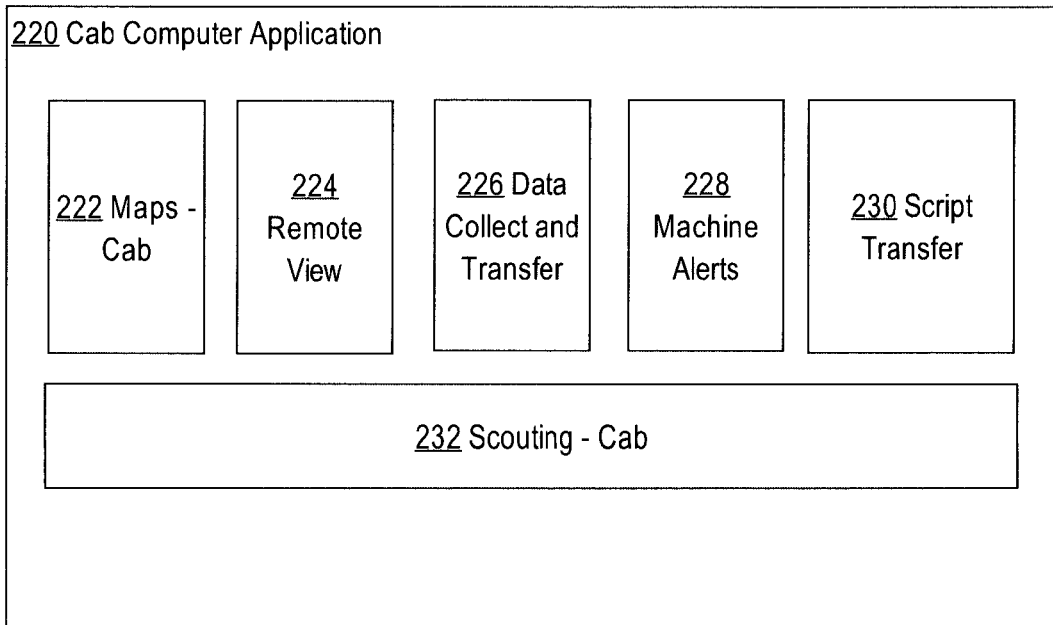

Data Manager

| Nitrogen | Planting | Practices | Soil |

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

+ Add New Planting Plan

601

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

FIG. 6

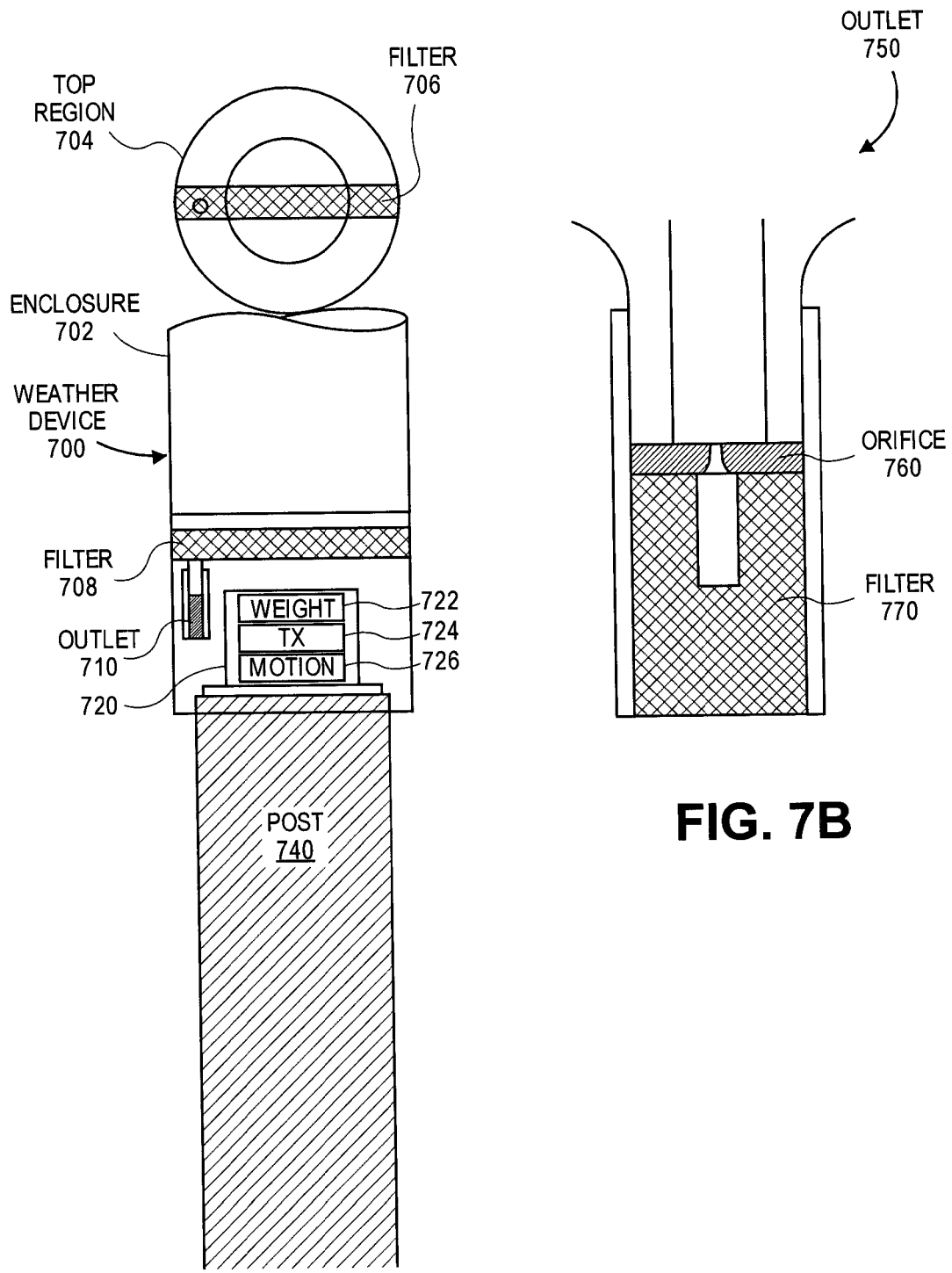

FIELD WEATHER MAP 800

| FIELD 810 | | FIELD 820 | |
|---|---|---|---|
| PREC. REGION 811 | WORKABILITY 814 | PREC. REGION 821 | WORKABILITY 824 |
| RAINFALL RATE 812 | WATER RUNOFF RATE 815 | RAINFALL RATE 822 | WATER RUNOFF RATE 825 |
| PREDICTED RAINFALL 813 | NITROGEN LOSS ESTIMATE 816 | PREDICTED RAINFALL 823 | NITROGEN LOSS ESTIMATE 826 |
| | WORKABILITY 817 | | WORKABILITY 827 |
| FIELD 830 | | FIELD 840 | |
| PREC. REGION 831 | WORKABILITY 834 | PREC. REGION 841 | WORKABILITY 844 |
| RAINFALL RATE 832 | WATER RUNOFF RATE 835 | RAINFALL RATE 842 | WATER RUNOFF RATE 845 |
| PREDICTED RAINFALL 833 | NITROGEN LOSS ESTIMATE 836 | PREDICTED RAINFALL 843 | NITROGEN LOSS ESTIMATE 846 |
| | WORKABILITY 837 | | WORKABILITY 847 |

FIG. 8

WEATHER DEVICE 1200

WEATHER DEVICE 1300

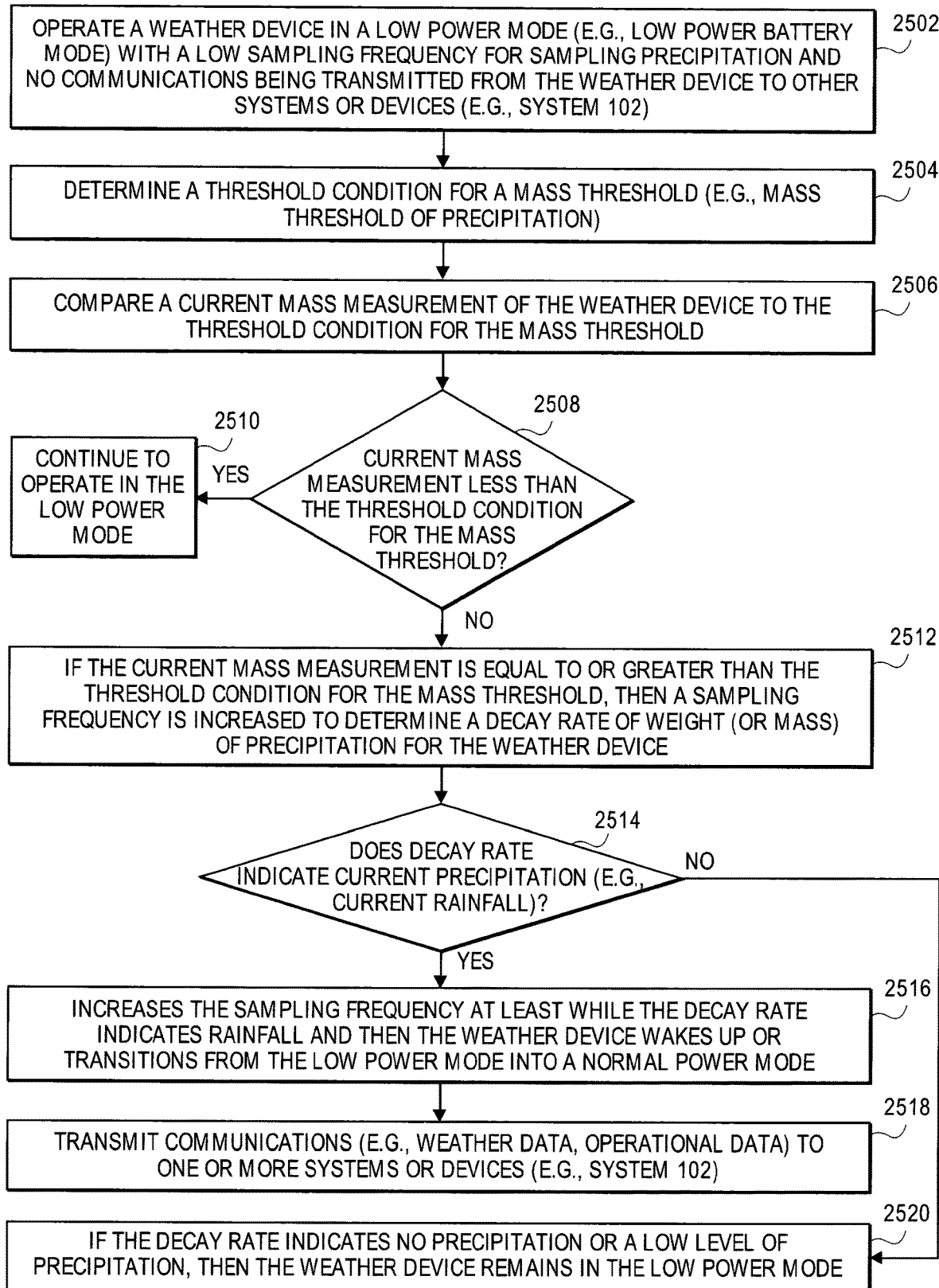

SYSTEMS, METHODS, AND DEVICES FOR MONITORING WEATHER AND FIELD CONDITIONS

BENEFIT CLAIM

This application claims the benefit under 35 U.S.C. § 120 as a Continuation of application Ser. No. 15/551,582, filed Aug. 16, 2017, which claims the benefit of U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220, 852, filed on Sep. 18, 2015, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

Embodiments of the present invention relate to systems, methods, and devices for monitoring weather and field conditions.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter.

A combine harvester or combine is a machine that harvests crops. A coverage map of a combine displays regions of the field that have been harvested by that combine. Weather conditions such as rain, hail, drought, etc. may negatively impact crop yields. The operator of a planter or combine has more difficulty in making decisions in regards to planting, fertilization, harvesting, etc. for different field regions with no knowledge of current weather conditions.

SUMMARY

In one embodiment, a system for monitoring weather conditions for field operations comprises a plurality of weather devices for monitoring weather conditions of fields with at least at one weather device in proximity to each field being monitored and at least one weather device having an electronics module for determining weather data including precipitation data. An agricultural computer system includes at least one processing unit for executing instructions for monitoring weather conditions. The at least one processing unit is configured to execute instructions to receive weather data from the plurality of weather devices for monitoring weather conditions of fields, to process the weather data, and to generate data including precipitation rate for monitoring weather conditions and operations of the plurality of weather devices.

In one example, at least one weather device comprises an enclosure for collecting precipitation, a filter, an electronics module, an outlet for releasing precipitation that has been collected by the at least one weather device, and a transceiver for transmitting communications to the weather system and for receiving communications from the weather system during a first power mode of the at least weather device. No communications are transmitted or received during a second power mode. At least one weather device switches from the second power mode to the first power mode upon detection of precipitation.

In another example, the electronics module determines a precipitation rate based on a mass of the filter at a first time, a mass of the filter at a second time, and leak rate of an orifice region of an outlet of the at least one weather device.

In another example, at least one weather device includes a first orifice positioned beneath a first precipitation collection area and a first droplet counter disposed below the first orifice to count droplets released from the first orifice. The at least one weather device also includes a second orifice that is positioned beneath a second precipitation collection area and a second droplet counter disposed below the second orifice to count droplets released from the second orifice. The weather system may determine a first estimated precipitation rate based on a first signal of the first droplet counter and may determine a second estimated precipitation rate based on a second signal of the second droplet counter.

In another example, the weather system determines a corrected precipitation rate that is based on at least one of the first estimated precipitation rate when the first estimated precipitation rate is in a first range of precipitation rates, the second estimated precipitation rate when the second estimated precipitation rate is in a second range of precipitation rates, and a weighted average of the first and second estimated precipitation rates.

In another example, the system for monitoring weather conditions for field operations further comprises a plurality of soil characteristic sensors with each soil characteristic sensor including a plurality of sensing elements disposed to contact soil along sidewalls of an opening of each soil characteristic sensor. Each soil characteristic sensor is configured to measure soil characteristics including at least one of soil moisture, soil temperature, and soil electrical conductivity and then communicate the soil characteristics to the weather system.

In another embodiment, an apparatus for monitoring weather conditions for field operations comprises a droplet former disposed to receive precipitation elements with an inlet, form droplets, and guide the droplets to a desired location of an outlet. A droplet counter is positioned to be vertically aligned with the outlet and is disposed to count droplets released by said outlet of the droplet former based on the droplets passing between first and second electrical contacts of the droplet counter.

In one example, the droplet former comprises a funnel having a textured inner surface with an upper portion of the textured inner surface having a greater downward slope than a lower portion of the textured inner surface. The droplet former forms and dispenses droplets to the droplet counter at a consistent velocity. The textured inner surface of the droplet former reduces a statistical deviation of droplet size, shape, and velocity which are released at the outlet in comparison to a statistical deviation of size, shape, and velocity of precipitation elements which are received at the inlet.

In another example, the textured inner surface of the droplet former comprises regularly-spaced roughness elements which are arranged in a plurality of radially-spaced groupings disposed at a plurality of heights along the height of the inner surface.

In another embodiment, a circuit for measuring precipitation comprises a droplet counter circuit to generate an output signal in response to input signals from first and second electrical contacts of a droplet counter and a comparator circuit coupled to the droplet counter circuit. The comparator circuit compares the output signal of the droplet counter circuit to a reference voltage signal. The comparator circuit generates an output signal in response to comparing the output signal of the droplet counter circuit to the reference voltage signal.

In one example, the output signal of the comparator circuit may comprise a first value when the output signal of the droplet counter circuit is less than the reference voltage signal and a second value when the output signal of the droplet counter circuit is greater than the reference voltage signal. The comparator circuit sends the output signal to a data processing system that is communicatively coupled to the comparator circuit. The data processing system increments a droplet count upon the output signal switching from the second value to the first value.

In another embodiment, a circuit for measuring precipitation comprises a droplet-based oscillator circuit to generate a first frequency that is a function of resistance between first and second electrical contacts of a droplet counter, a fixed-frequency oscillator circuit to generate a second frequency that is constant, and a divider circuit coupled to the droplet-based oscillator circuit and the fixed-frequency oscillator circuit. The divider circuit generates an output signal based on a comparison of the first frequency and the second frequency.

In one example, the first frequency is greater when a droplet electrically connects the first and second electrical contacts in comparison to when no droplet is present between the first and second electrical contacts. The first frequency is greater than the second frequency when a droplet electrically connects the first and second electrical contacts and the first frequency is less than the second frequency when no droplet is present between the first and second electrical contacts.

In another example, the output signal comprises a droplet pulse having a pulse period and comprising a plurality of sub-pulses. The pulse period comprises a length that is related to a size of a droplet and a number of the plurality of sub-pulses relates to a conductivity of the droplet.

BRIEF DESCRIPTION OF THE DRAWINGS

The present invention is illustrated by way of example, and not by way of limitation, in the accompanying drawings and in which:

FIG. 2 illustrates two views of an example logical organization of sets of instructions in main memory when an example mobile application is loaded for execution.

FIG. 6 depicts an example embodiment of a spreadsheet view for data entry.

FIG. 7A shows an example of a weather device for monitoring weather conditions in accordance with one embodiment.

FIG. 7B shows an exploded view of a weather device for monitoring weather conditions in accordance with one embodiment.

FIG. 8 illustrates an exemplary field weather map 800 in accordance with one embodiment.

FIG. 25 illustrates a flow diagram of one embodiment for a method 2500 of controlling power management of a weather device.

DETAILED DESCRIPTION

Described herein are systems, weather devices, and methods for monitoring weather conditions for field operations (e.g., tillage, planting, fertilization, irrigation, harvesting, tiling, etc.). In one embodiment, a system (e.g., cloud based system) for monitoring weather conditions for field operations includes a plurality of weather devices for monitoring weather conditions of associated fields with at least at one weather device being in proximity to each field being monitored and at least one weather device having an electronics module for determining weather data including precipitation data. An agricultural computer system includes at least one processing unit for executing instructions for monitoring weather conditions. The at least one processing unit is configured to execute instructions to receive weather data from the plurality of weather devices for monitoring weather conditions of fields, to process the weather data, and to generate data including precipitation rate for monitoring weather conditions and operations of the plurality of weather devices.

Embodiments of the invention provide improved systems and method for monitoring weather conditions in fields with weather devices. During certain weather conditions (e.g., no precipitation), the weather devices can be operated in a low power mode to reduce power consumption. In other weather conditions (e.g., precipitation, rain, hail, etc.), the weather devices can be operated in a normal power mode for more frequent sampling of precipitation and transmission of weather data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
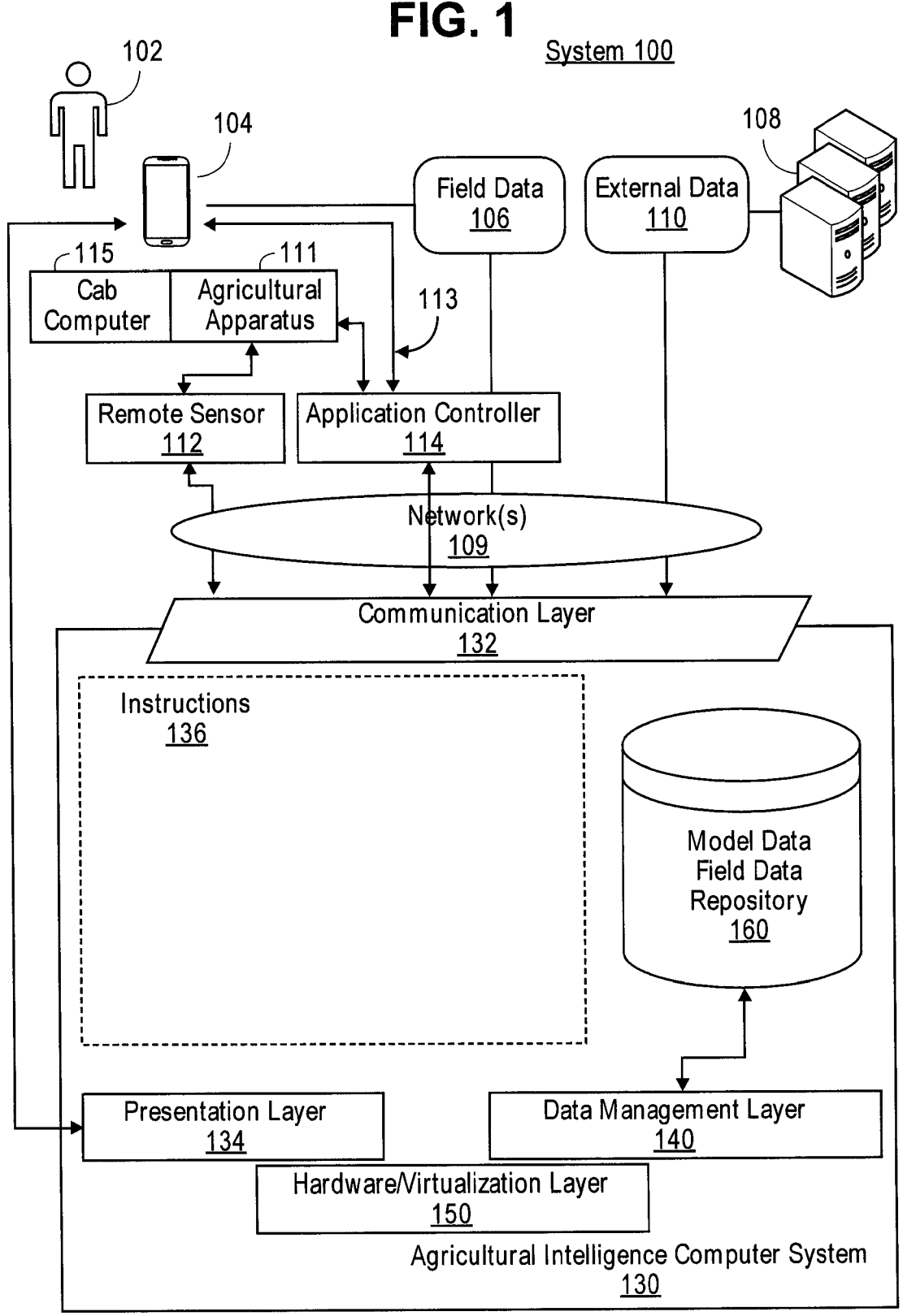
FIG. 1 illustrates an example computer system that is configured to perform the functions described herein, shown in a field environment with other apparatus with which the system may interoperate.

FIG. 1 illustrates an example computer system 100 that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109, as discussed herein.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108 and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, sensor data from a remote sensor 112. As one example, sensor data may include weather data (e.g., precipitation, rainfall rate, predicted rainfall, water runoff rate region, nitrogen loss estimate, condition or status of weather device, power mode of weather device, etc.) from one or more remote sensors 112 for monitoring weather conditions of associated fields (e.g., weather devices) with at least at one remote sensor being in proximity to each field being monitored. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, instructions 136, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
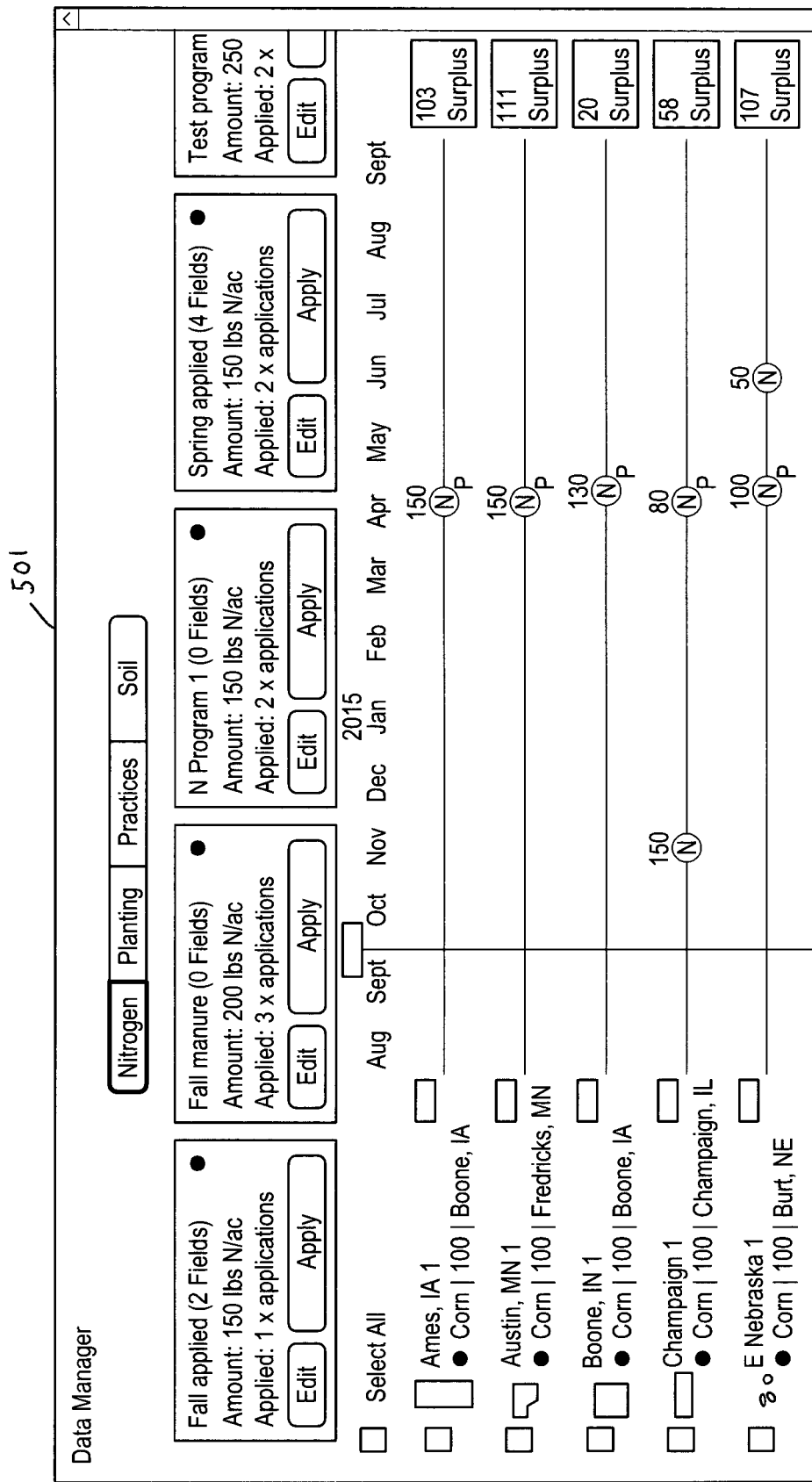
FIG. 5 depicts an example embodiment of a timeline view for data entry.

FIG. 5 depicts an example embodiment of a timeline view 501 for data entry. Using the display depicted in FIG. 5, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view 601 for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model data may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
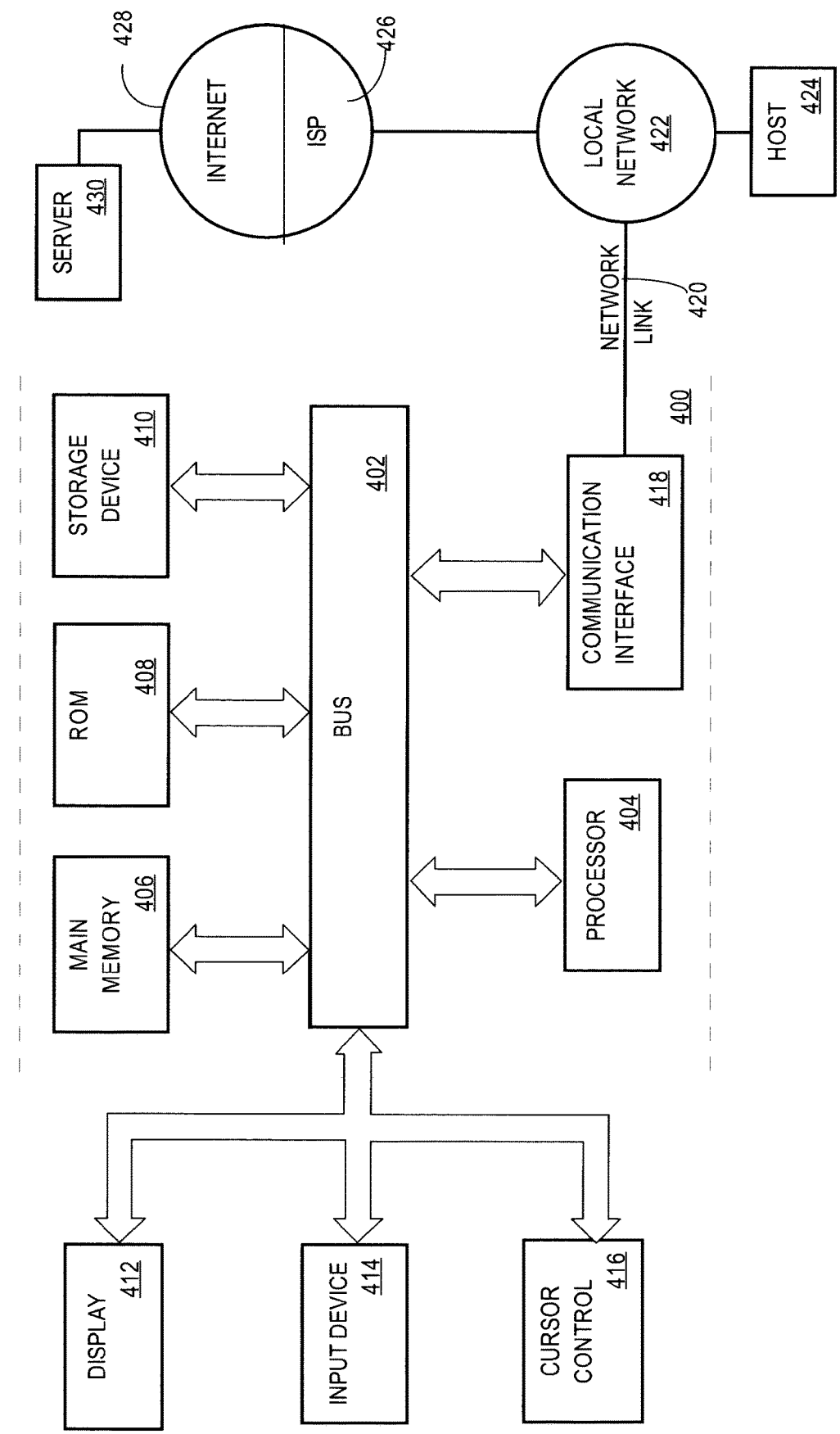
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies. In one example, instructions 136 include different types of instructions for controlling and monitoring field operations. The instructions 136 may include weather instructions to provide field-specific recent weather data (e.g., precipitation, rainfall rate, water runoff rate region, nitrogen loss estimate, condition or status of weather device, power mode of weather device, etc.) and forecasted weather information (e.g., forecast predicted rainfall). The instructions 136 can be included with the programmed instructions of the layer 150.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112, and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into soil zones along with a panel identifying each soil zone and a soil name, texture, and drainage for each zone. Mobile computer application 200 may also display tools for editing or creating such, such as graphical tools for drawing soil zones over a map of one or more fields. Planting procedures may be applied to all soil zones or different planting procedures may be applied to different subsets of soil zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use. In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data (e.g., precipitation, rainfall rate, water runoff rate region, nitrogen loss estimate, condition or status of weather device, power mode of weather device, etc.) and forecasted weather information (e.g., forecast predicted rainfall). This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, weather devices for sensing weather conditions, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same location or an estimate of nitrogen content with a soil sample measurement.

Figure 3:
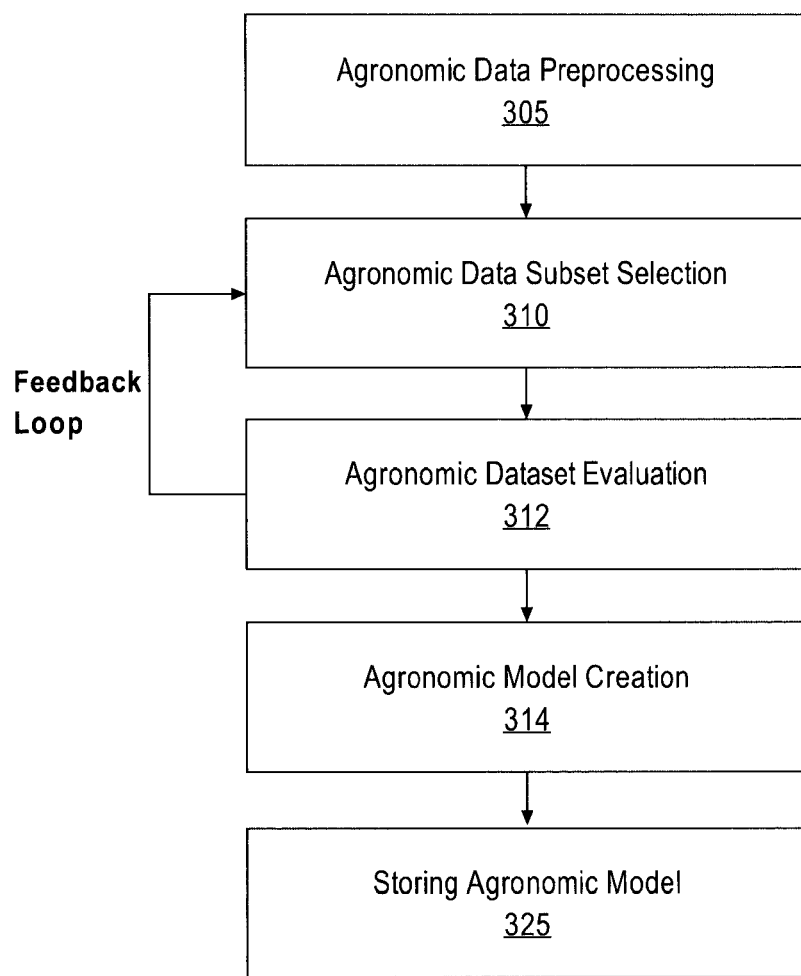
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

FIG. 7A shows an example of a weather device, or sensor providing weather data, for monitoring weather conditions in accordance with one embodiment. The weather device 700 (e.g., rain gauge device) may include a top region 704 having a filter 706, an enclosure 702 (or housing) for collecting precipitation, a filter 708, an electronics module 720, and an outlet 710 for releasing precipitation that has been collected by the weather device. A top region 704 can be in an open position as illustrated in FIG. 7A or in a closed horizontal position with respect to a ground reference. Precipitation enters through the top region or the enclosure and then passes through a filter 708. A weight module 722 measures a mass of a portion of the weather device and precipitation in this portion of the weather device to determine a mass of the precipitation for a certain time or time period. In one example, the weight module 722 measures a mass of the filter 708 at a first time and then measures a mass of the filter 708 with precipitation at a second time. The precipitation then leaves the filter 708 via an outlet 710. The weather device 700 may be attached to a post 740 or any other fixture for stability in a field or other location. The electronics module 720 includes the weight module 722 and a transceiver (TX) 724 for transmitting communications to other systems and devices (e.g., system 130, system 400, system 3102, etc.) via the network 109 or 3180 and also receiving communications from other systems or devices. The electronics module may also include different types of sensors including a motion sensor 726 (e.g., accelerometer, gyroscope) for determining a motion of the weather device, a moisture sensor, a temperature sensor, or a nutrient (e.g., Nitrogen, Phosphorous, Potassium) sensor.

In some embodiments, the sensor 726 may determine an orientation of the rain gauge relative to gravity. In some examples, an alert may be sent to the user if the measured orientation crosses a threshold indicating that the gauge is in a non-operational orientation (e.g., has fallen over or tipped to an angle at which rain accumulation and/or weight measurement are unpredictable). In other examples, the weight measurement may be corrected based on an orientation-compensation curve empirically developed to correct the weight signal at a range of orientations.

Reported measured values (e.g., rainfall, temperature, nutrient levels, etc.) may be reported to the user, for example, as an average value for a sensor location, a sub-field region, a single field, a subset of fields associated with the user, across all fields associated with the user, and/or across all sensors associated with the user.

FIG. 7B shows an exploded view of an outlet 750 of a weather device for monitoring weather conditions in accordance with one embodiment. The outlet 750 corresponds to the outlet 710 and includes similar components as the outlet 710. The outlet 750 includes orifice region 760 and a filter 770 (e.g., charcoal filter). In one example, precipitation flows through the filter 708 above the outlet into the outlet 710 (or outlet 750) through an orifice region 760 having a plurality of orifices, and then flows into the filter 770 and exits the filter 770. A weight module measures a mass of the precipitation while in the filter 708 during different time periods to determine weather data (e.g., rate of precipitation, rainfall) for the weather device.

In one embodiment, a weather device has an enclosure diameter of 3-6 inches and an orifice region with orifices having a diameter of 0.01-0.03 inches. In other embodiments, the orifice region has orifices with a larger diameter (e.g., 0.03-0.5 inches). A precipitation rate (e.g., rainfall rate) can be calculated at a certain time interval (e.g., every 5 minutes) and recorded with the electronic module. An equation for determining the precipitation rate in terms of inches of rain per hour follows below:

$$\text{Rainfall rate (inches/minute)} = k^*[(\text{Weight Measurement 2}) - (\text{Weight Measurement 1}) + (\text{leak rate})]/(\text{Measurement Period } i)$$

The parameters for this equation include 'k' which is equal to an empirical ratio between inches of rain in the gauge to the weight measurement and Weight Measurements 1 and 2 being first and second weight measurements, respectively. Leak Rate equals a rate at which water leaks through the orifice, which may be either (1) a constant for systems having a near-constant leak rate, (2) determined by an empirical relation between the weight measurement and leak rate, or (3) measured by a flow meter or drop counter. A Measurement Period i equals the time between measurements 1 and 2.

In a specific example, the weather device has an enclosure or housing diameter of 6 inches, orifices with diameters of 0.016 inches. A precipitation rate of 0.1 inch/hour is determined for a calculated change in mass of 212 grams during a time period of 4.7 hours and a calculated change in height of collected precipitation of 0.47 inches. In another example, a precipitation rate of 0.2 inch/hour is determined for a calculated change in mass of 813 grams during a time period of 9.2 hours and a calculated change in height of collected precipitation of 1.8 inches. In another example, a precipitation rate of 0.3 inch/hour is determined for a calculated change in mass of 1890 grams during a time period of 14 hours and a calculated change in height of collected precipitation of 4.2 inches.

In order to conserve power of the weather device, the weather data may only be transmitted to other systems or devices via the network when a sufficient change in the measured mass of precipitation (or calculated rainfall) occurs.

Water-contacting surfaces of the rain gauge embodiments described herein may be coated with a hydrophobic coating such as teflon. In some embodiments the inner surface of the outlet orifice may be coated with a hydrophobic coating such as teflon. In such embodiments, the rain gauge preferably does not empty until a threshold height and/or weight of water has accumulated in the rain gauge. In other embodiments, a spring-biased gate or other device may be provided in the orifice to prevent the rain gauge from emptying until a threshold height and/or weight of water has accumulated in the rain gauge.

In rain gauge embodiments which do not empty until a threshold height and/or weight has accumulated in the rain gauge, an alternative method may be carried out for estimating rain accumulation and/or flow rate. In one example, acquired weight measurement data points are fit to a periodic function (e.g., sine wave, sawtooth wave, etc.). It should be appreciated that the number of periods of the periodic function during a measurement period correspond to the number of times the rain gauge has emptied during the measurement period. The number of periods of the periodic measurement period is preferably multiplied by a known weight and/or height of water corresponding to each emptying event to determine the weight and/or height of water accumulated during the measurement period. In some embodiments, alternatively or in addition to fitting the weight measurement data points to a periodic function, the number of periods (e.g., the number of emptying events) is determined by counting the number of times the data set crosses a threshold value between the minimum and maximum of the data set and dividing by two. In some examples, the rate of accumulation of rainfall may be further determined by determining the rate of increase of the weight measurement during a measurement period during which the weight measurement is increasing with time (i.e., when the rain gauge is not emptying).

Figure 9:
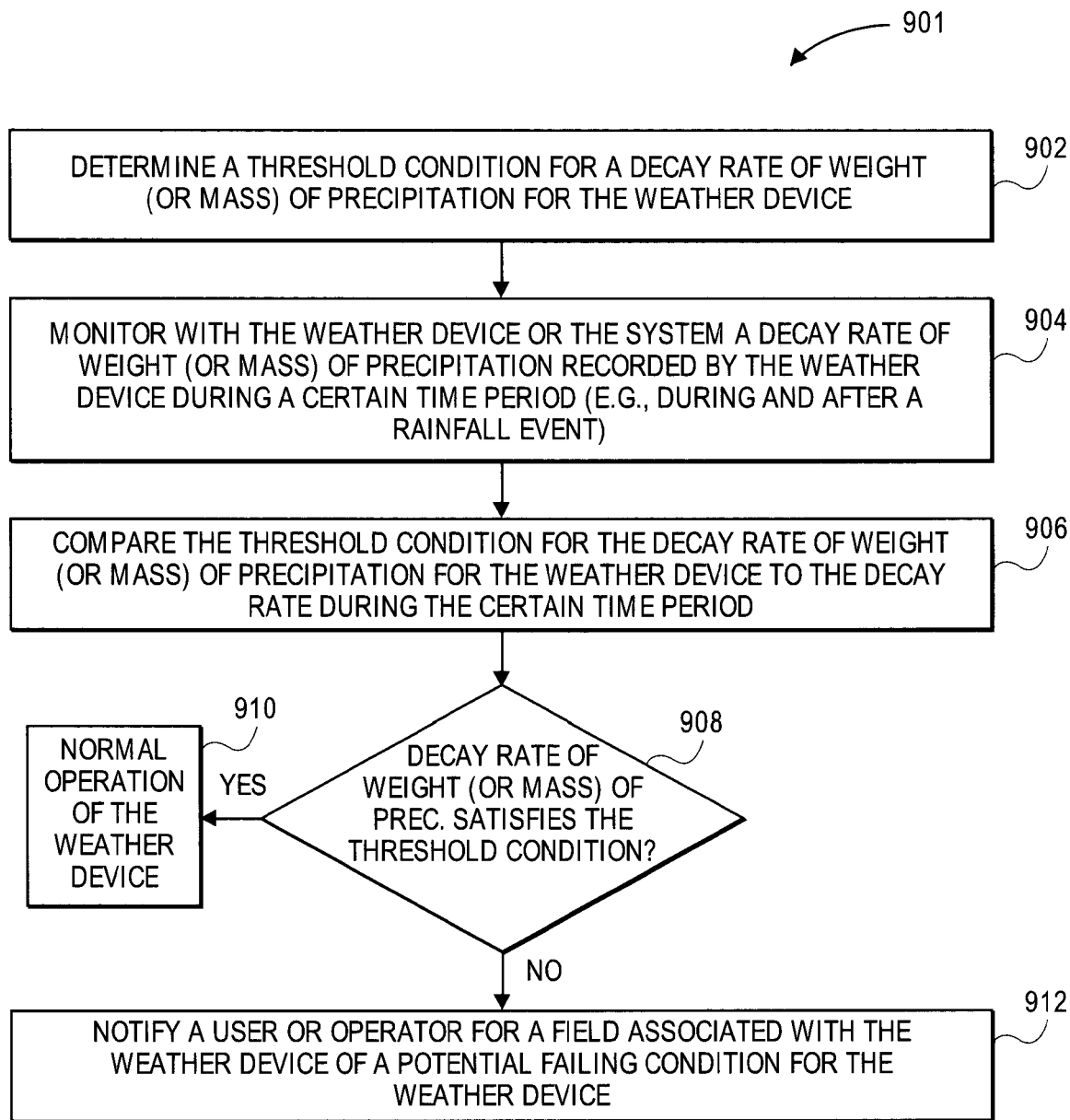
FIG. 9 illustrates a flow diagram of one embodiment for a method 901 of health monitoring of a weather device.

FIG. 9 illustrates a flow diagram of one embodiment for a method 900 of health monitoring of a weather device. The method 901 is performed by processing logic that may comprise hardware (circuitry, dedicated logic, etc.), software (such as is run on a general purpose computer system or a dedicated machine or a device), or a combination of both. In one embodiment, the method 901 is performed by processing logic of at least one data processing system (e.g., system 130, system 400, system 3102, system 2900, weather device). The system or device executes instructions of a software application or program with processing logic. The software application or program can be initiated by a system or may notify an operator or user of a machine (e.g., tractor, planter, combine) depending on operating conditions of the weather device being monitored.

At block 902, a threshold condition for a decay rate of weight (or mass) of precipitation for a weather device is determined by the weather device or the system. At block 904, a weather device or system monitors a decay rate of weight (or mass) of precipitation recorded by the weather device during a certain time period (e.g., during and after a rainfall event). At block 906, the threshold condition for the decay rate of weight (or mass) of precipitation for the weather device is compared to the decay rate during the certain time period by the weather device or the system. At block 908, if the decay rate of weight (or mass) of precipitation during the certain time period satisfies the threshold condition, then the weather device is operating normally at block 910 and does not have filter or orifice issues. Otherwise, if the threshold condition is not satisfied at block 908, then a user or operator for a field associated with the weather device, is notified of this potential failing condition for the weather device at block 912. For example, a filter or orifice may be clogged or not working properly for the potential failing condition. In one embodiment, the threshold condition is associated with a maximum level for the decay rate and a minimum level for the decay rate. The threshold condition is satisfied if the decay rate during the certain time period is greater than or equal to the minimum level and less than or equal to the maximum level of the decay rate. The threshold condition is not satisfied if the decay rate during the certain time period exceeds a maximum level for the threshold condition or is below a minimum level for the threshold condition.

In some embodiments, the operations of the method(s) disclosed herein can be altered, modified, combined, or deleted. The methods in embodiments of the present invention may be performed with a device, an apparatus, or data processing system as described herein. The device, apparatus, or data processing system may be a conventional, general-purpose computer system or special purpose computers, which are designed or programmed to perform only one function, may also be used.

Figure 23:
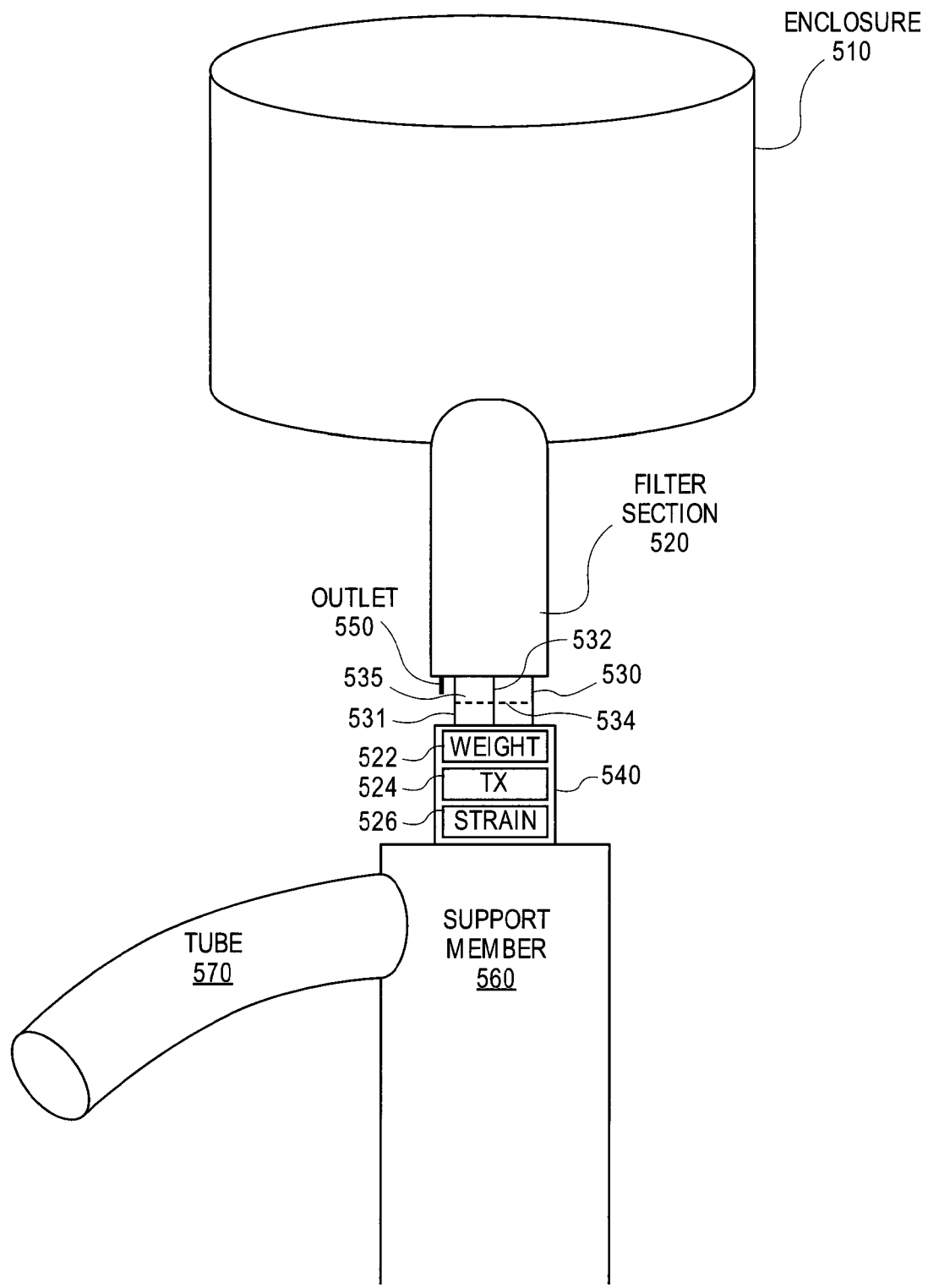
FIG. 23 shows an example of a weather device for monitoring weather conditions in accordance with one embodiment.

FIG. 23 shows an example of a weather device for monitoring weather conditions in accordance with one embodiment. The weather device 500 (e.g., rain gauge device) may include an enclosure or housing 512 for collecting precipitation, a filter section 520 having one or more filters (e.g., charcoal filters), and an electronics module 540. Precipitation enters through the enclosure and then flows through the filter section 520. A weight module 522 measures a mass of the filter section or portion of the filter section and precipitation in the filter section (or change in precipitation) to determine a mass of the precipitation for a certain time or time period. The precipitation then flows through the filter section 520 via an outlet 550. The electronics module 540 includes the weight module 522 and a transceiver (TX) 524 for transmitting and receiving communications from any system or device. In one embodiment, the transceiver 524 transmits communications (e.g., weather data, operational data) to the system (e.g., 130, 400, 3102, 2900, etc.) via the network (e.g., 109, 3180) and also receives communications from the system (e.g., 130, 400, 3102, 2900, etc.). The electronics module may also include different types of sensors including a strain sensor 526 for determining a motion of the weather device likely caused by weather conditions such as a wind. The filter section 520 is attached to the electronics module 540 via three supporting members 531, 532, and 530. In one example, the supporting member 532 is a pivot and the supporting members 530 and 531 are strain gauges. In another example, strain gauges 534 and 535 are coupled to the supporting members 530-532. If no or approximately no wind exists, then the strain gauges should have no applied strain or stress. Otherwise, if a wind exists, then the strain gauges should indicate an applied strain or stress and a strength and direction of the wind can be determined from the applied strain or stress of the strain gauges.

The weather device 500 may be mounted to a support member 560 and also include a conical textile tube (e.g., windsock) that indicates wind direction and relative wind speed. Wind direction is the opposite of the direction in which the windsock is pointing while wind speed is indicated by the tube's angle relative to the supporting member 560.

Figure 24A:
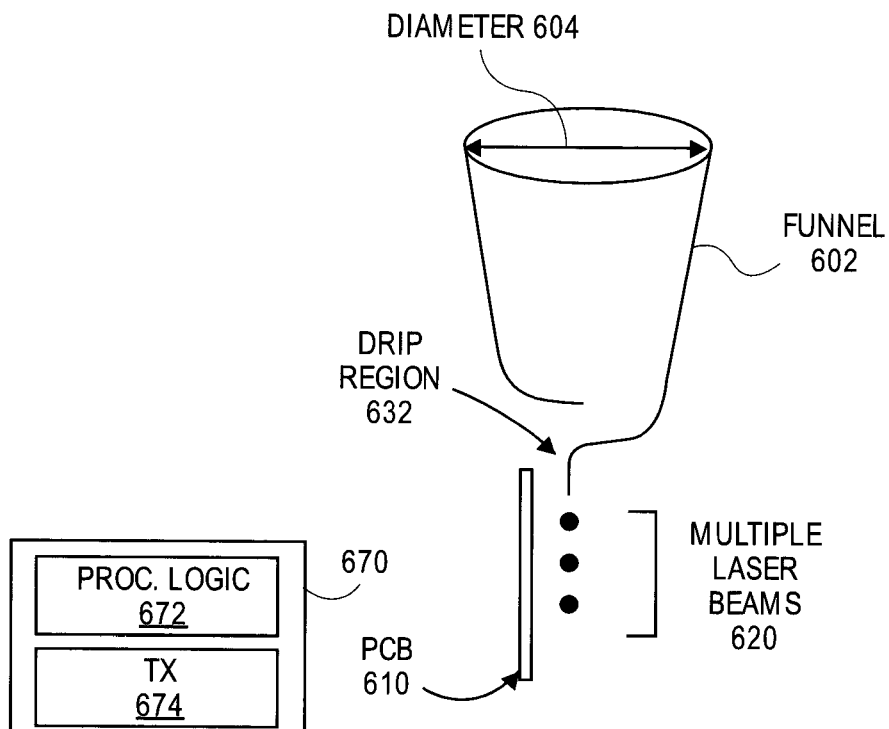
FIG. 24A shows an example of a weather device for monitoring weather conditions in accordance with one embodiment.
Figure 24B:
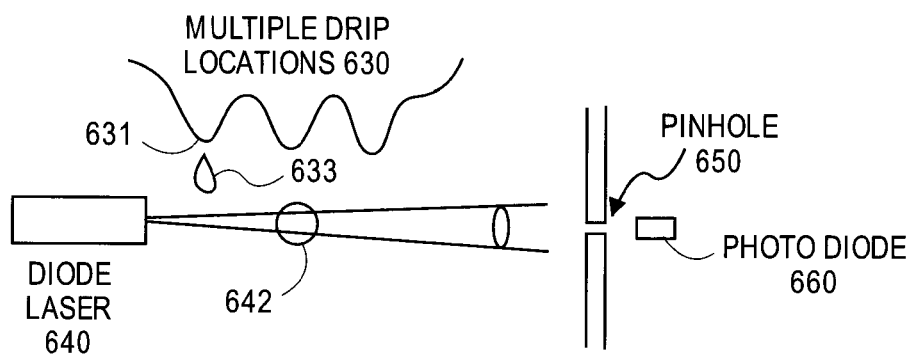
FIG. 24B shows an example of multiple drip locations 630 of a weather device with each drip location producing drops that pass through a laser beam in accordance with one embodiment.

FIG. 24A shows an example of a weather device for monitoring weather conditions in accordance with one embodiment. The weather device 600 (e.g., rain gauge device) may include a funnel 602 for collecting precipitation, a printed circuit board 610 having one or more lasers 640 (e.g., diode lasers) for generating multiple laser beams 620, and an electronics module 670. Precipitation enters through a diameter 604 (e.g., 1-4 inches, 2 inches, etc.) of the funnel and then flows through a drip region 632. In one example, the drip region 632 includes multiple drip locations 630 with each drip location producing drops that pass through a laser beam. FIG. 24B shows an example of multiple drip locations 630 of a weather device with each drip location producing drops that pass through a laser beam in accordance with one embodiment. The laser beam generated by the diode laser 640 corresponds to one or more of the laser beams 620. For example, a drip location 631 produces a drop 633 that passes through a laser beam of diode laser 640. A divergent axis 642 may be focused in a vertical plane such that light from the laser beam passes through a pin hole 650. A photo diode 660 captures the light passing through the pin hole 650. In this manner, an amount of light transmitted by the diode laser 640 and captured by the photo diode 660 will be reduced based on one or more drops 633. Processing logic of electronics module 670 can then determine a rate of precipitation for a certain time period based on light data received from one or more photo diodes. In one embodiment, the transceiver (TX) 674 transmits communications (e.g., weather data, light data, operational data) to the system (e.g., 130, 400, 3102, 2900, etc.) via the network (e.g., 109, 3180) and also receives communications from the system (e.g., 130, 400, 3102, 2900, etc.). The electronics module 670 may also include different types of sensors including a temperature sensor for determining an ambient temperature, a moisture sensor for determining a moisture level, and a strain sensor for determining a motion of the weather device likely caused by weather conditions such as a wind.

Figure 12A:
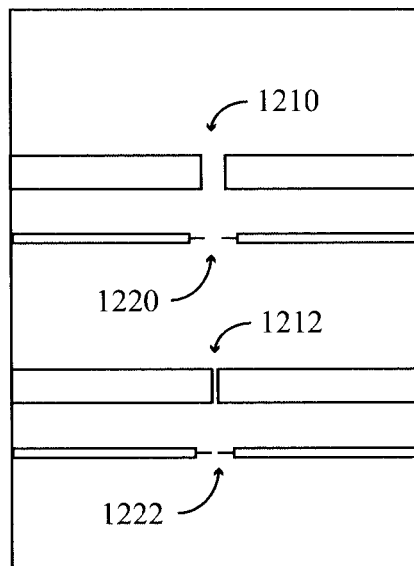
FIG. 12A is a cross-sectional view of still another embodiment of a weather device.
Figure 12B:
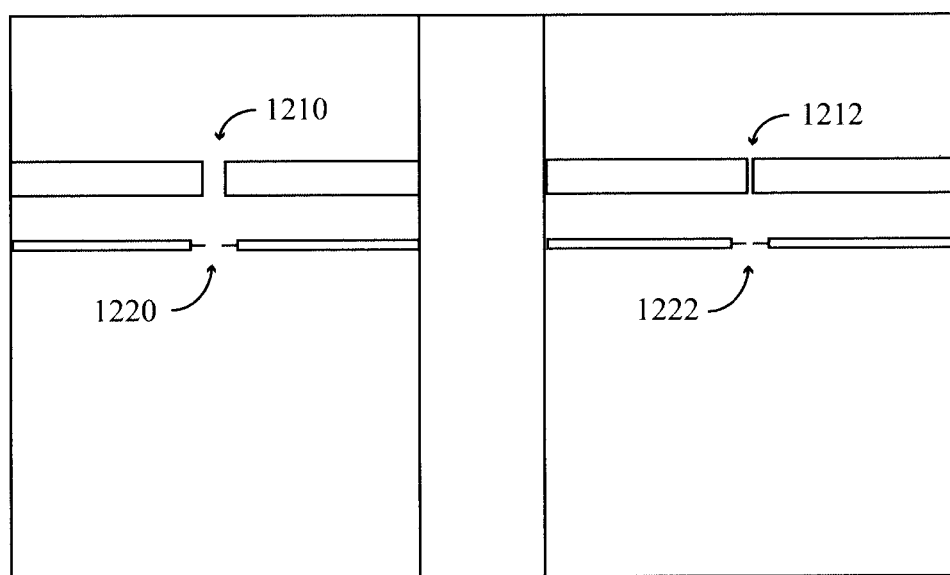
FIG. 12B is a cross-sectional view of yet another embodiment of a weather device.

FIG. 12A shows an example of a weather device for monitoring weather conditions in accordance with one embodiment. The weather device 1200 preferably includes a first orifice 1210 beneath a first precipitation collection area and a first droplet counter 1220 disposed below the first orifice 1210 to count droplets released therefrom. The weather device 1200 preferably includes a second orifice 1212 beneath a second precipitation collection area and a second droplet counter 1222 disposed below the second orifice to count droplets released therefrom. The second orifice 1222 preferably has a different diameter from the first orifice 1220 (e.g., the second orifice may be larger or smaller than the first orifice). The droplet counters 1220, 1222 may comprise electrical contact sensors (e.g., paired electrical leads which are placed in electrical communication by passage of a droplet there between) or other sensor configured to detect passage of droplets (e.g., optical sensors, capacitive sensors, electromagnetic sensors). In the embodiment of FIG. 12A, the first and second orifices 1210, 1212 (and their associated droplet counters 1220, 1222) are disposed "in series" such that droplets pass through the first orifice prior to passing through the second orifice. In the embodiment of FIG. 12B, the first and second orifices 1210, 1212 (and their associated droplet counters 1220, 1222) are disposed "in parallel" such that droplets passing through the first orifice do not pass through the second orifice. The embodiment of 12B may comprise a plurality of orifice-counter pairs housed within the same device, or a plurality of orifice-counter pairs housed in separate devices and in data communication with a single system (e.g., system 130, system 400, system 2900, system 3102). A separation 1250 (e.g., a wall) preferably prevents overflow precipitation from one orifice being deposited in the other orifice (e.g., in the case of orifice plugging).

Figure 16:
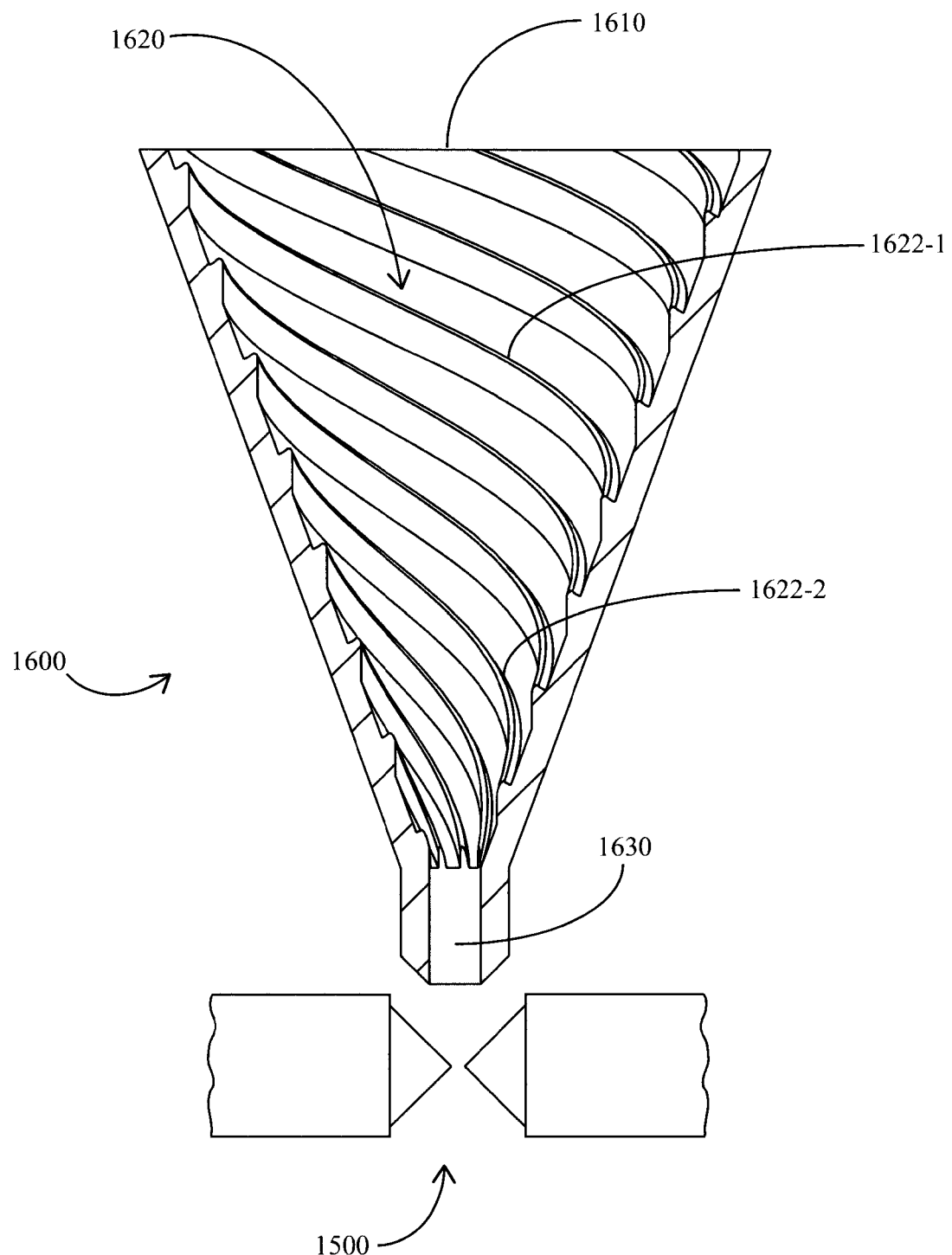
FIG. 16 is a cross-sectional view embodiment of a droplet former in combination with an embodiment of a droplet sensor.
Figure 17:
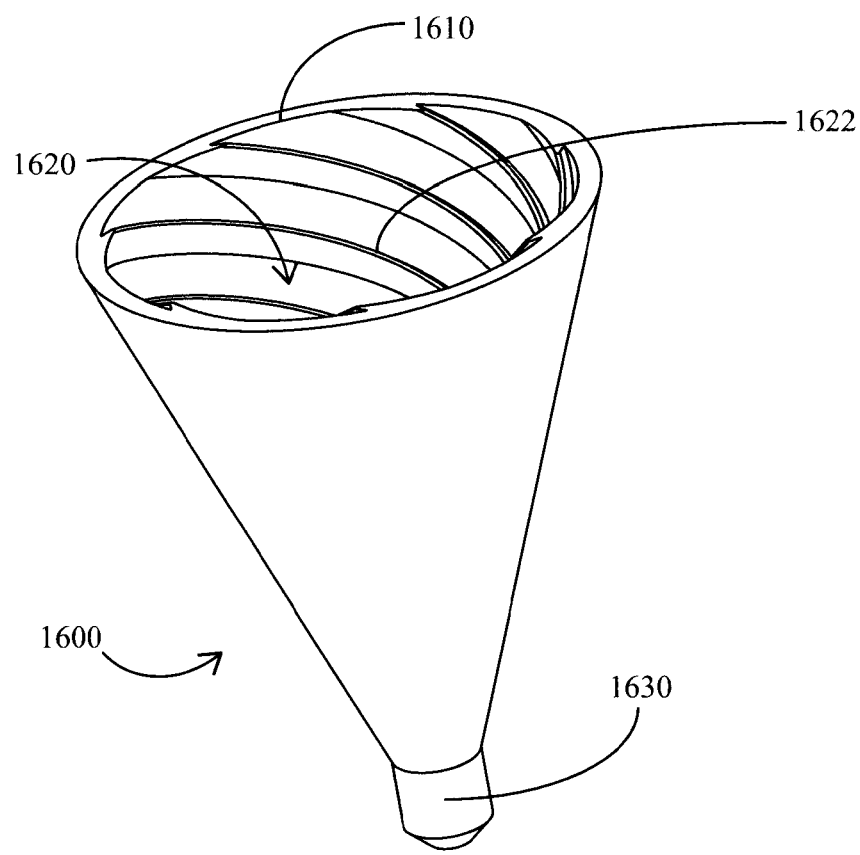
FIG. 17 is a perspective view of the droplet former of FIG. 16.
Figure 18:
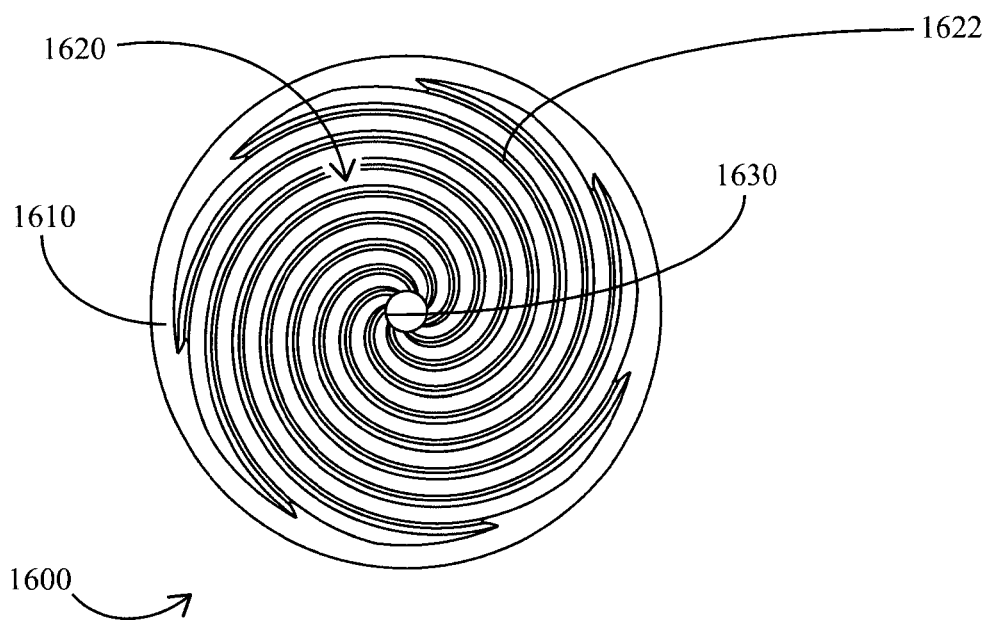
FIG. 18 is a plain view of the droplet former of FIG. 16.

Referring to FIGS. 16-18, in some embodiments precipitation elements having potentially varying sizes and shapes (e.g., drops, mist, droplets, streams) is received and formed into droplets by droplet former 1600 before being counted by (e.g., contacting, passing through) the droplet counter 1500. The droplet former 1600 preferably guides droplets to a desired location and preferably forms and releases droplets into the droplet counter such that droplets are dispensed to the droplet counter at the same location. The droplet former 1600 preferably absorbs the impact of precipitation falling onto the droplet former, preferably slows the velocity (e.g., vertical component of velocity) of the precipitation and preferably forms and dispenses droplets to the droplet counter at a consistent velocity (e.g., consistent speed, consistent direction). The droplet former 1600 preferably reduces the statistical deviation (e.g., standard deviation) of droplet sizes (e.g., by dividing relatively large precipitation elements received at an inlet into droplets of standard size released at an outlet into the droplet counter, and/or by combining small mist particles into a stream of precipitation which is divided into droplets of standard size released at the outlet into the droplet counter).

In the embodiment illustrated in FIGS. 16-18, the droplet former 1600 comprises a funnel having an inlet 1610 that is preferably wider than an outlet 1630. The outlet 1630 is preferably disposed vertically above the droplet counter 1500 (e.g., a central cylindrical axis of the outlet is disposed vertically above the gap between electrical contacts 1510 and preferably horizontally equidistant from the electrical contacts). The funnel is preferably provided with a textured inner surface such as a spiral ramp 1620 extending arcuately downwardly along an inner wall of the funnel. Portions 1622 of the spiral ramp 1620 are best illustrated in FIG. 16. Upper portions (e.g., 1622-1) of the spiral ramp 1620 preferably have a greater downward slope than lower portions (e.g., 1622-2) of the spiral ramp. A vertical spacing between vertically adjacent upper portions of the spiral ramp is preferably greater than a vertical spacing between vertically adjacent lower portions of the spiral ramp. In other embodiments, textured inner surface of the droplet former may comprise another texture such as regularly-spaced roughness elements which may be arranged in a plurality of radially-spaced groupings disposed at a plurality of heights along the height of the inner surface.

In operation, precipitation received in the inlet 1610 is preferably guided to the outlet 1630 by contact with the inner wall of the droplet former 1600. The impact of falling precipitation is preferably absorbed by the inner wall of the droplet former. Upon contacting the spiral ramp, relatively large precipitation elements may be divided into smaller droplets. Upon contacting the spiral ramp, precipitation and/or droplets preferably travels along the spiral ramp and decrease in velocity (e.g., downward velocity, horizontal velocity) due to friction; it should be appreciated that the spiral ramp extends the distance traveled by droplets while in contact with the inner wall, thus increasing the amount of kinematic energy lost to friction prior to release. The width of droplets formed at the outlet 1630 is preferably dependent on the width of an inner diameter of the outlet and/or the shape of a lower lip of the outlet 1630. For example, an outlet having a pointed lower lip (as illustrated in FIG. 16) may form narrower droplets than another outlet embodiment having the same inner diameter and a chamfered lower lip. Upon release from the outlet 1630 into the droplet counter, a plurality of droplets preferably have a smaller range (e.g., statistical distribution) of size, shape, horizontal velocity and vertical velocity than the precipitation elements introduced into the inlet 1610.

In some embodiments, an upstream droplet former (e.g., funnel) may be placed upstream (e.g., vertically above) the droplet former 1600 and disposed to release droplets on the sidewalls of the droplet former 1600. The upstream droplet former may be similar to the droplet former 1600 or may have a smooth inner surface rather than a textured inner surface.

The weather device 1200 is preferably in data communication with a system such as any of the systems described herein. In operation, the system preferably determines a precipitation rate based on the signals generated by the droplet counters 1220, 1222. In some embodiments, the system determines a first estimated precipitation rate based on the signal from the first droplet counter 1220 and a second estimated precipitation rate based on the signal from the second droplet counter 1222. (As used herein, the term "precipitation rate" may refer to accumulation per time or total accumulation.) The system (e.g., 130, 400, 2900, 3102, etc.) may then report a filtered precipitation rate based on the first and second estimated precipitation rates. In some examples, the corrected precipitation rate comprises the first estimated precipitation rate when the first estimated precipitation rate is in a first range and the second estimated precipitation rate when the second estimated precipitation rate is in a second range. In one such example, when the first estimated precipitation rate is within the lower of the two ranges, the system selects the estimated precipitation rate as the corrected precipitation rate based on the signal from the droplet counter disposed beneath the smaller orifice, and when the second estimated precipitation rate is within the higher of the two range, the system selects the estimated precipitation rate as the corrected precipitation rate based on the signal from the droplet counter disposed beneath the larger orifice. In other embodiments, the corrected precipitation rate comprises a weighted average of the first and second estimated precipitation rates; for example, the average may be weighted toward the estimated precipitation rate based on the signal from the droplet counter disposed beneath the smaller orifice when the first estimated precipitation rate is within the lower of the two ranges.

In other examples, a plurality (e.g., two, three, four) of droplet counters (or other precipitation measurement devices such as precipitation weighing devices or tipping bucket devices as described herein) may be used to estimate a plurality of estimated precipitation rates (or near-concurrent) precipitation rate (e.g., during a single rainfall event). The plurality of precipitation measurement devices may be located on a single device, on a plurality of devices in a single field, or a plurality of devices in different fields. A measurement quality criterion is preferably determined based on the signals from both precipitation measurement devices and used to determine a corrected precipitation rate based on the plurality of estimated precipitation rates by filtering out an estimated precipitation rate having a measurement quality criterion below a threshold and/or by determining a weighted average of the plurality of estimated precipitation rates, in which the weighted average is weighted toward the estimated precipitation rates having higher measurement quality criteria. The measurement quality criterion associated with an estimated precipitation rate may comprise a degree of correspondence (e.g., the inverse of a percentage difference) between the estimated precipitation rate and the other estimated precipitation rates (e.g., the average value of other estimated precipitation rates reported by other measurement devices on the same structure, in the same field or within a threshold distance of the measurement device) or a precipitation rate provided by a system, weather store 3150, or weather predictions 3160.

Figure 15:
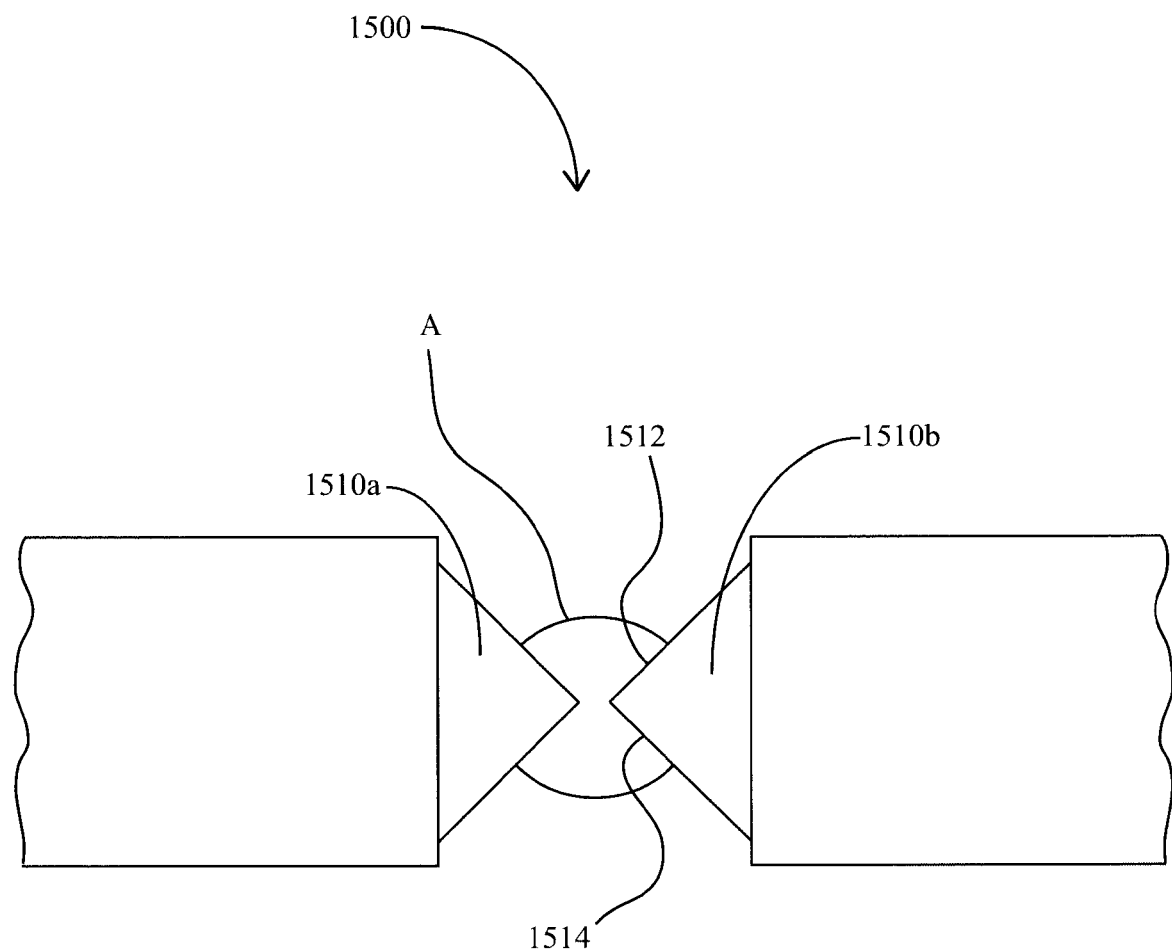
FIG. 15 illustrates an embodiment of a droplet counter.

The droplet counters (e.g., 1220, 1222) described herein may comprise an improved droplet counter 1500 as illustrated in FIG. 15. Droplet counter 1500 preferably includes two electrical contacts 1510*a*, 1510*b* between which a precipitation droplet A (e.g., raindrop) passes during operation. The electrical contacts 1510 may have a pyramidal or conical shape. The electrical contacts 1510 preferably include an upper, downwardly angled surface 1512 along which the droplet A may slide while passing between the electrical contacts. The electrical contacts 1510 preferably include a lower, upwardly angled surface 1514 which the droplet A may contact while passing between the electrical contacts.

Figure 13:
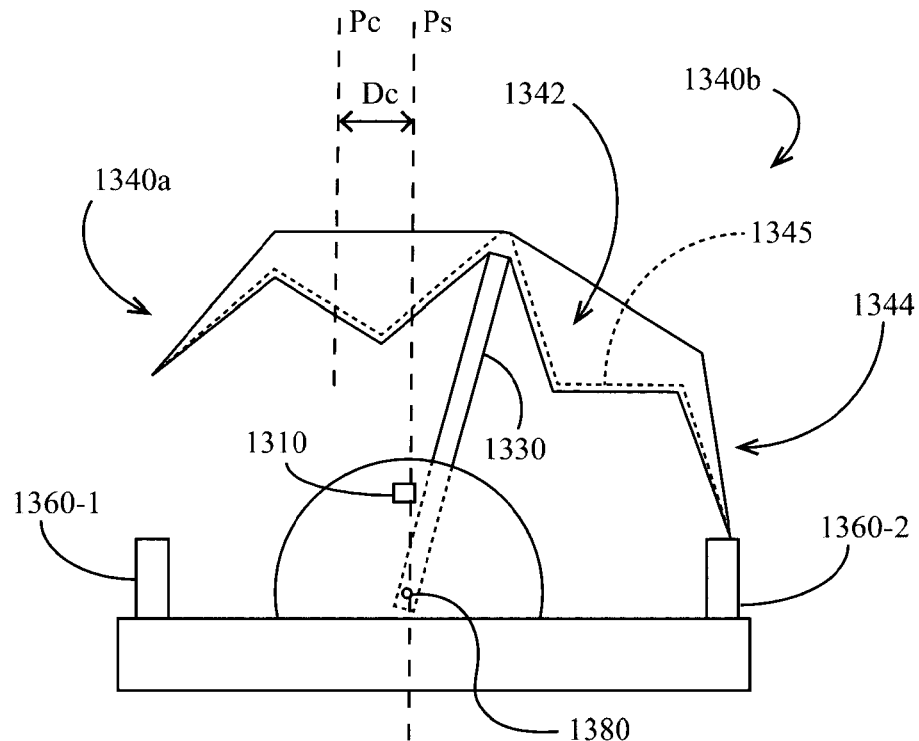
FIG. 13 is a side elevation view of another embodiment of a weather device.

Turning to FIG. 13, a weather device 1300 is illustrated which is preferably configured to count tipping events in which buckets 1340*a*, 1340*b* pivot from a first position (e.g., resting on stop 1360-1) to a second position (e.g., resting on stop 1360-2). In the illustrated embodiment, the buckets 1340 are pivotally mounted to a pivot 1380 by a support 1330. In operation, when the bucket 1340 is in a tipped position (e.g., the position illustrated in FIG. 13), precipitation empties from and does not substantially accumulate in the downward-tipped bucket (1340*b* in the position illustrated in FIG. 13) while precipitation accumulates in the upward-tipped bucket (1340*a* in the position illustrated in FIG. 13). In the illustrated embodiment, each bucket 1340 comprises a collection portion 1342 in which precipitation initially accumulates when the bucket is upward-tipped. Once precipitation has filled the collection portion 1340 and overflows into an overflow portion 1344, the center of gravity of the buckets 1340 (and accumulated precipitation therein) preferably shifts such that a tipping event occurs.

Figure 14:
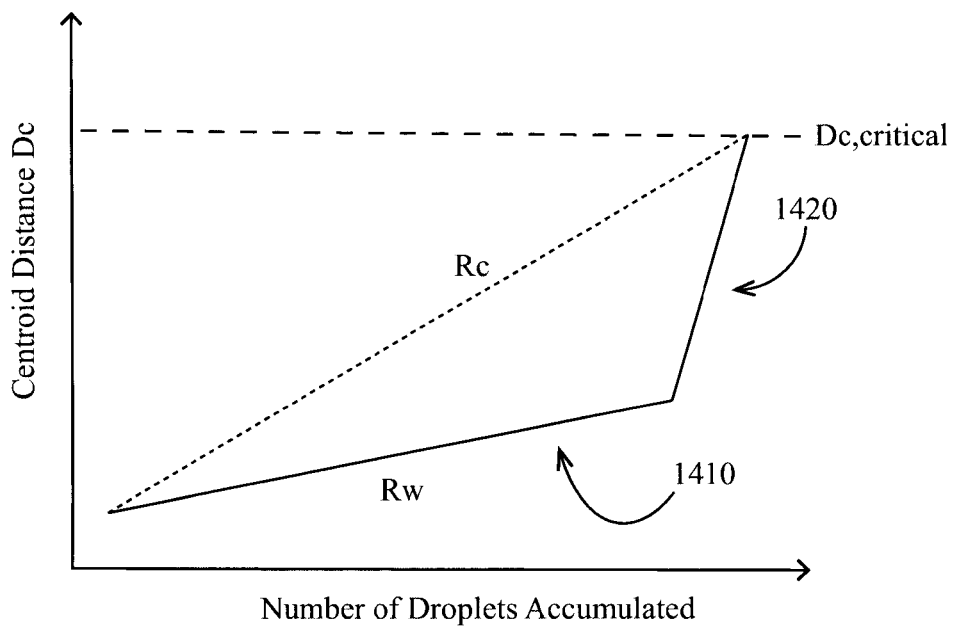
FIG. 14 illustrates a relationship between accumulated drops and a lateral distance from the center of gravity of a weather device to a pivot axis of the weather device in accordance with one embodiment.

Referring to FIG. 14, a preferred response curve Rw of the weather device 1300 illustrates a change in centroid distance Dc (the distance between a vertical plane Ps defined by the location of the pivot 1380 and a vertical plane Pc defined by the center of gravity of the buckets 1340, precipitation accumulated therein, and support 1330) with the number of droplets accumulated in one of the buckets 1340. It should be appreciated that a tipping event occurs when the centroid distance Dc exceeds a critical threshold Dc, critical. A response curve Rc illustrates a change in centroid distance Dc with the number of droplets accumulated as rain accumulates in a conventional tipping bucket rain gauge (e.g., the rain gauge disclosed in U.S. Pat. No. 5,898,110, hereby incorporated herein by reference). In response curve Rc of a conventional tipping bucket rain gauge, Dc increases gradually (e.g., at a constant slope) to the critical value Dc, critical. In the preferred response curve Rw of the weather device 1300, Dc increases at a slower pace (e.g., due to the centroid of water in the collection portion 1345 being at or adjacent to the plane Ps) and then increases abruptly (e.g., resulting in a change in the derivative of the curve Rw, a step change and/or singularity in the curve Rw, or a step change and/or singularity in the derivative of the curve Rw) at a critical number of droplets and then increases to Dc, critical with accumulation of relatively few (e.g., 1, 2, 3, 4, 5, between 1 and 2, between 1 and 3, between 1 and 4, between 1 and 5) droplets. This abrupt increase in Dc in the response curve Rw may result from the outboard (e.g., away from the plane Ps) movement of drops overflowing the collection portion 1342 into the overflow portion 1344 (e.g., movement by gravity along a downward-sloped surface of the overflow portion 1344). A first portion 1410 of the response curve Rw may have a first slope while a second portion 1410 of the response curve 1420 may have a second slope greater than the first slope.

The buckets 1340 (e.g., a lower surface 1345 thereof) may be provided with a hydrophobic coating such that substantially all of the precipitation is removed from the downward-tipped bucket following a tipping event.

The weather device 1300 may comprise a motion sensor 1310 (e.g., Hall-effect sensor, optical sensor, capacitive sensor, contact switch, electrical switch) disposed to detect movement of a component of the weather device (e.g., the support 1330).

FIG. 25 illustrates a flow diagram of one embodiment for a method 2500 of controlling power management of a weather device. The method 2500 is performed by processing logic that may comprise hardware (circuitry, dedicated logic, etc.), software (such as is run on a general purpose computer system or a dedicated machine or a device), or a combination of both. In one embodiment, the method 2500 is performed by processing logic of at least one data processing system (e.g., system 130, system 400, system 3102, system 2900, weather device). The system or device executes instructions of a software application or program with processing logic. The software application or program can be initiated by a system or a weather device.

At block 2502, a weather device is operating in a low power mode (e.g., low power battery mode) with a low sampling frequency for sampling precipitation and no communications being transmitted from the weather device to other systems or devices (e.g., system 130, system 3102). In one example, during a dry time period, the weather device samples for precipitation once during a certain time period (e.g., 10-30 minutes, 15 minutes, etc.) At block 2504, a threshold condition for a mass threshold (e.g., mass threshold of precipitation) is determined. At block 2506, a current mass measurement for the weather device is compared to the threshold condition for the mass threshold. At block 2508, processing logic of the system or device determines if the current mass measurement of the weather device is less than the threshold condition for the mass threshold. If so, then the weather device continues to operate in the low power mode at block 2510. Otherwise, if the current mass measurement is equal to or greater than the threshold condition for the mass threshold at block 2508, then a sampling frequency is increased to determine a decay rate of weight (or mass) of precipitation for the weather device at block 2512.

At block 2514, the weather device determines whether the decay rate indicates current precipitation (e.g., current rainfall). If so, then the weather device at block 2516 increases the sampling frequency (or maintains increase in sampling frequency at block 2512) at least while the decay rate indicates rainfall and then the weather device wakes up or transitions from the low power mode into a normal power mode. At block 2518, the weather device transmits communications (e.g., weather data, operational data) to one or more systems or devices (e.g., 130, 400, 2900, 3102, etc.). A transmission rate or frequency of sending transmission may also increase during the normal power mode. At block 2520, if the decay rate indicates no precipitation or a low level of precipitation, then the weather device remains in the low power mode.

It should be appreciated that a method similar to the method 2500 may be implemented on weather devices comprising a droplet counter (e.g., the droplet counter embodiments described herein). In some such embodiments, the signal generated by a droplet counter may be compared to a signal threshold and the weather device may increase a droplet counter sampling frequency and/or change from a low power mode to a normal power mode if the signal exceeds the signal threshold.

In some embodiments, a gateway weather device (e.g., one of the precipitation sensor embodiments described herein) may be in data communication with the network (e.g., 109, 3180) and additionally in direct data communication (e.g., via wireless radio communication) with secondary devices or other sensors, such as weather devices and/or soil sensor devices (e.g., nutrient sensors), nearby, in the same field, or in nearby fields. In such embodiments, the gateway weather device may receive data (e.g., sensor data such as precipitation and soil measurement data) from the secondary devices and transmit the received data (along with data gathered and/or generated by the gateway weather device) to the network. In some such embodiments, the gateway weather device and the secondary devices may be programmed to (1) recover from a low-power mode simultaneously at regular intervals, (2) transfer data from the secondary devices to the gateway weather device, and (3) transfer data from the gateway weather device to the network. In other such embodiments, the gateway weather device maybe programmed to send a "wake-up" signal to the secondary devices instructing the secondary devices to (1) recover from a low-power mode, (2) gather sensor data, and (3) transfer data to the gateway weather device; the "wake-up" signal may be sent from the gateway weather device to the secondary devices when a "wake-up" criterion (e.g., a threshold measurement by the gateway weather device, passage of a threshold amount of time, receipt of a "wake-up" command from the network by the gateway weather device).

In some embodiments weather or field condition data is made available to the user (e.g., stored with software in a storage medium for later viewing, displayed to the user on opening an app or other software, displayed on field manager computing device 104, displayed on cab computer 115, and/or sent to the user by an electronic message such as SMS alert, app push notification, or e-mail) at a frequency determined based on a threshold magnitude and/or time. As used herein, an "alert" may refer to making data available by any appropriate method or device, including storing data for later viewing by the user. In some embodiments, the threshold used to determine the frequency at which data is made available is selected such that data is made available more frequently during an event. Block 912 of FIG. 9 and Block 2518 of FIG. 25 are examples of weather or field condition date being made available to a user.

In one example, standard rainfall alert frequency may be set at a default threshold such as once per day or once per week such that rainfall data is recorded and made available to the user at the default threshold frequency. Once a rainfall rate or rainfall amount reaches an event threshold (e.g., empirically corresponding to a rainfall event), the alert frequency is changed to an event frequency (e.g., such that data is made available to the user every 10 minutes or every accumulation of an additional ⅒th of an inch of rain, whichever occurs sooner). Once the total amount of rainfall exceeds a significant rainfall threshold (empirically corresponding to a significant rainfall event), the alert frequency may be reduced either to the standard alert frequency or another lower frequency. Once the rate of rainfall decreases to an event conclusion threshold (e.g., empirically corresponding to no current rainfall event), the user may be alerted that the event has concluded and the alert frequency may be reduced to the standard alert frequency.

It should be appreciated that the methods described herein for adjusting the frequency at which data is made available to the user are not limited to rainfall events and may be used to dynamically determine alert frequency for other field and weather data such as wind speed, air temperature, soil temperature, soil moisture, soil nutrient levels, solar radiation, and/or carbon dioxide levels or any other type of field data and weather data discussed herein.

In some embodiments, the operations of the method(s) disclosed herein can be altered, modified, combined, or deleted. The methods in embodiments of the present invention may be performed with a device, an apparatus, or data processing system (e.g., field manager computing device 104, cab computer 115, system 130, system 400, system 3102, system 2900, etc.) as described herein. The device, apparatus, or data processing system may be a conventional, general-purpose computer system or special purpose computers, which are designed or programmed to perform only one function, may also be used.

FIG. 8 illustrates an exemplary field weather map 800 in accordance with one embodiment. The field weather map 800 is displayed on a monitor (e.g., display device, computing device, cab computer 115, etc.) in a tractor cab of a machine or the field weather map 800 is displayed on a device (e.g., field manager computing device 115, tablet device, computing device, desktop computer, cellular phone, smart TV) that can be located at any location in order for the operator to make a workability decision (e.g., tillage, planting, fertilization, harvesting, etc.) with regards to one or more fields, such as described in U.S. patent application Ser. No. 14/846,422 (hereby incorporated by reference). In one embodiment, the exemplary field weather map includes weather data for each field of an operator or farm that is experiencing a weather event (e.g., precipitation, rain, lightning, hail, etc.). The field weather map 800 illustrates weather data and workability information for fields 810, 820, 830, and 840. Each field includes weather data including a precipitation region (e.g., 811, 821, 831, 841), a rainfall rate region (e.g., 8212, 822, 832, 842), a predicted rainfall region (e.g., 813, 823, 833, 843), a water runoff rate region (e.g., 815, 825, 835, 845), and a nitrogen loss estimate (e.g., 816, 826, 836, 846). Values or parameters for these regions of the weather map can be represented graphically, numerically, or means for illustrated this weather data. The predicted rainfall region indicates a predicted rainfall during a weather event based on a weather prediction that can be refined or updated dynamically in real time based on actual measurement data.

A workability region (e.g., 814, 824, 834, 844) can display a decision-making parameter or value (e.g., percentage value of workability) and/or a number of bars that indicates the decision-making parameter or value on a scale (e.g., 1 to 10) for determining whether an operator should be performing an operation (e.g., tilling a field, planting a crop, fertilization, harvesting the crop) or not. In one example, the decision-making parameter or value can be based on measured precipitation and temperature for each field. A lower value (e.g., 0-50%, 1 to 5) may indicate that at least one of the weather, soil, and air conditions are not appropriate for performing the operation while a higher value (e.g., 50-100%, 6-10) may indicate that at least one of the weather, soil, and air conditions are appropriate or will soon be appropriate for performing the operation. A lower value or bars of the region may be shaded with a first color (e.g., red)

while a higher value or bars of the region may be shaded with a second color (e.g., green).

An improved workability region (e.g., 817, 827, 837, 847) can dynamically display a decision-making parameter or value (e.g., percentage value of workability) and/or a number of bars that indicates the decision-making parameter or value on a scale (e.g., 1 to 10) for determining whether an operator should be performing an operation (e.g., tilling a field, planting a crop, fertilization, harvesting the crop) or not. In one example, the decision-making parameter or value can be based on a rain gauge and moisture sensor for one or more weather devices for each field. A lower value (e.g., 0-50%, 1 to 5) may indicate that at least one of the weather, soil, and air conditions are not appropriate for performing the operation while a higher value (e.g., 50-100%, 6-10) may indicate that at least one of the weather, soil, and air conditions are appropriate or will soon be appropriate for performing the operation. A lower value or bars of the region may be shaded with a first color (e.g., red) while a higher value or bars of the region may be shaded with a second color (e.g., green).

In one example, the workability region (e.g., 814, 824, 834, 844) and the improved workability region (e.g., 817, 827, 837, 847) are combined into a single workability region for indicating workability of a field.

These weather parameters may be obtained from any source including a cloud based source (e.g., system 130, system 400, system 2900, system 3102, etc.), directly from a weather device in a field of interest, from an implement in the field, a remote server, a weather station, etc.

An operator can select any of the fields 810, 820, 830, an 840 in order to display more details of the weather data for the field. For example, the soil moisture data, air temperature data, weather forecast data, and soil temperature data may be displayed for the selected field.

Figure 10:
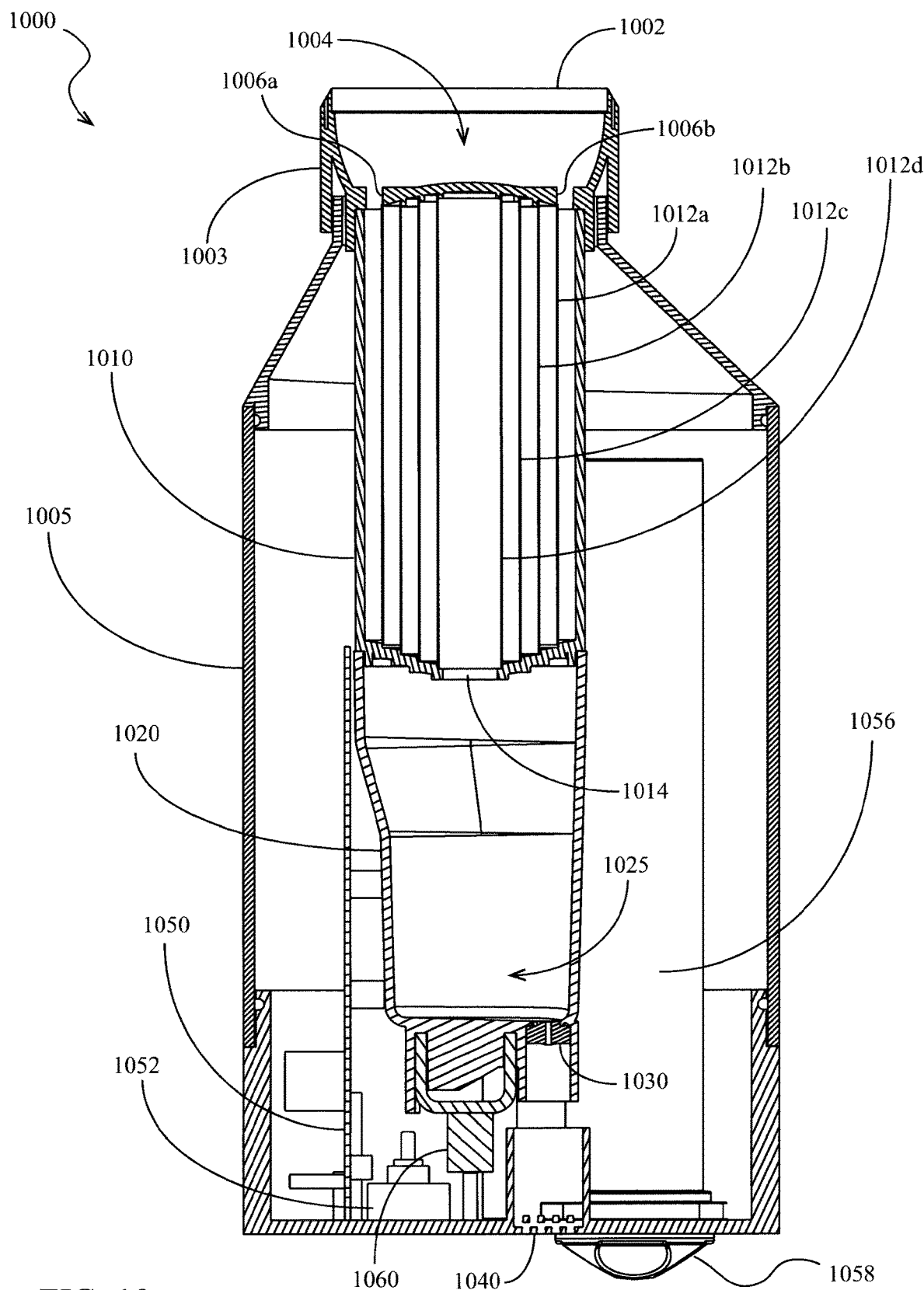
FIG. 10 is a cross-sectional view of another embodiment of a weather device.
Figure 11:
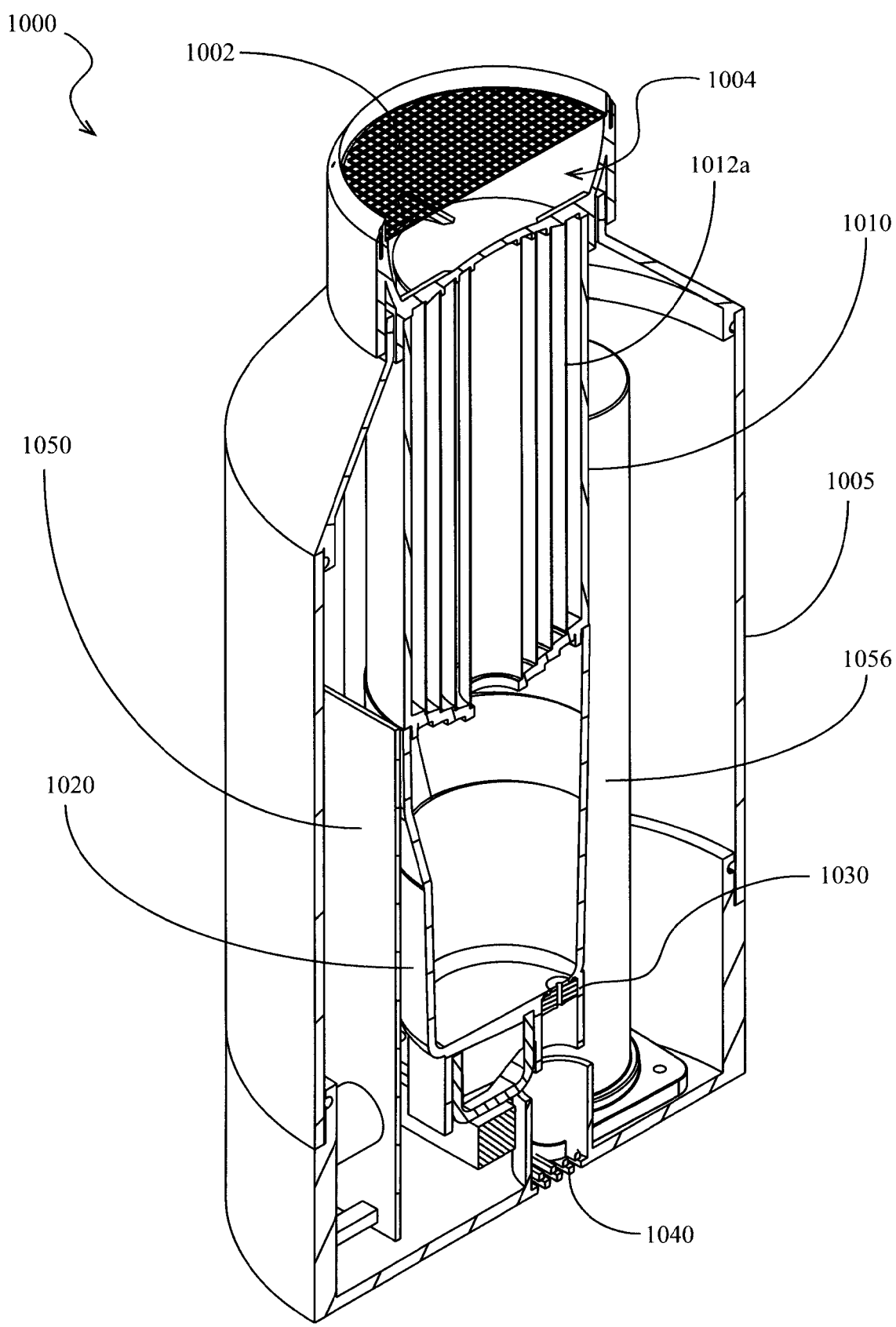
FIG. 11 is a perspective view of the weather device of FIG. 10 cut away along the section of FIG. 10.

Turning to FIGS. 10-11, a rain gauge 1000 for weighing accumulated precipitation is illustrated. The rain gauge 1000 may be used to carry out the processes described herein, including those illustrated in FIG. 9 and FIG. 25. The rain gauge 1000 may be in data communication with systems described herein, e.g., the system 130, system 400, system 3102, system 2900.

The rain gauge 1000 preferably includes a screen 1002 (e.g., a wire mesh filter screen) which may be provided with a hydrophobic coating. The term "hydrophobic coating" as used herein may refer to a hydrophobic coating such as Teflon or a superhydrophobic coating such as Nanomyte or Nanomyte SuperCN available from NEI Corp. in Somerset, N.J. The screen 1002 preferably protects an upper collection area 1004 bounded by an upper collection housing 1003 mounted to an upper portion of a housing 1005 of the rain gauge 1000. One or more openings 1006 preferably place the upper collection area 1004 with a filtration housing 1010 preferably disposed below the upper collection area 1004. The filtration housing 1010 preferably houses one or more filters, e.g., a series of concentrically arranged cylindrical filters 1012 (e.g., screen filters). An opening 1014 in a lower portion of the filtration housing 1010 preferably places the filtration housing in fluid communication with a weighing collection area 1025 housed by a weighing housing 1020, preferably disposed below the filtration housing 1010. An interior surface of the weighing housing 1020 may be provided with a hydrophobic coating such as teflon. An orifice (e.g., a ¹⁄₁₆ inch orifice) preferably places the weighing collection area 1025 in fluid communication with a fluid exit 1040 (e.g., a staggered grate).

In operation, precipitation (e.g., rain fall) preferably passes through the screen 1002 and collects in the upper collection area 1004. Collected precipitation preferably passes under influence of gravity through the openings 1006a, 1006b into the filtration housing 1010, preferably into a radially outer area radially outward of the most radially outward cylindrical filter 1012a. Under the influence of gravity, precipitation preferably passes sequentially through the concentrically arranged filters 1012a, 1012b, 1012c, 1012d toward the opening 1014. The precipitation then preferably falls into the weighing collection area 1015 and passes through the orifice 1030 and falls through the fluid exit 1040.

Droplet Counter Circuits

Figure 19:
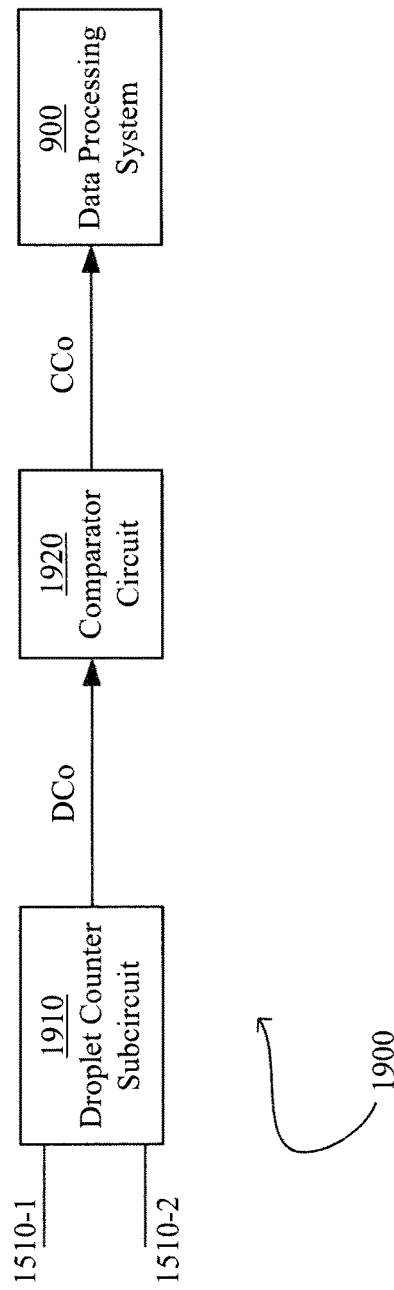
FIG. 19 schematically illustrates an embodiment of a droplet counter circuit.
Figure 20:
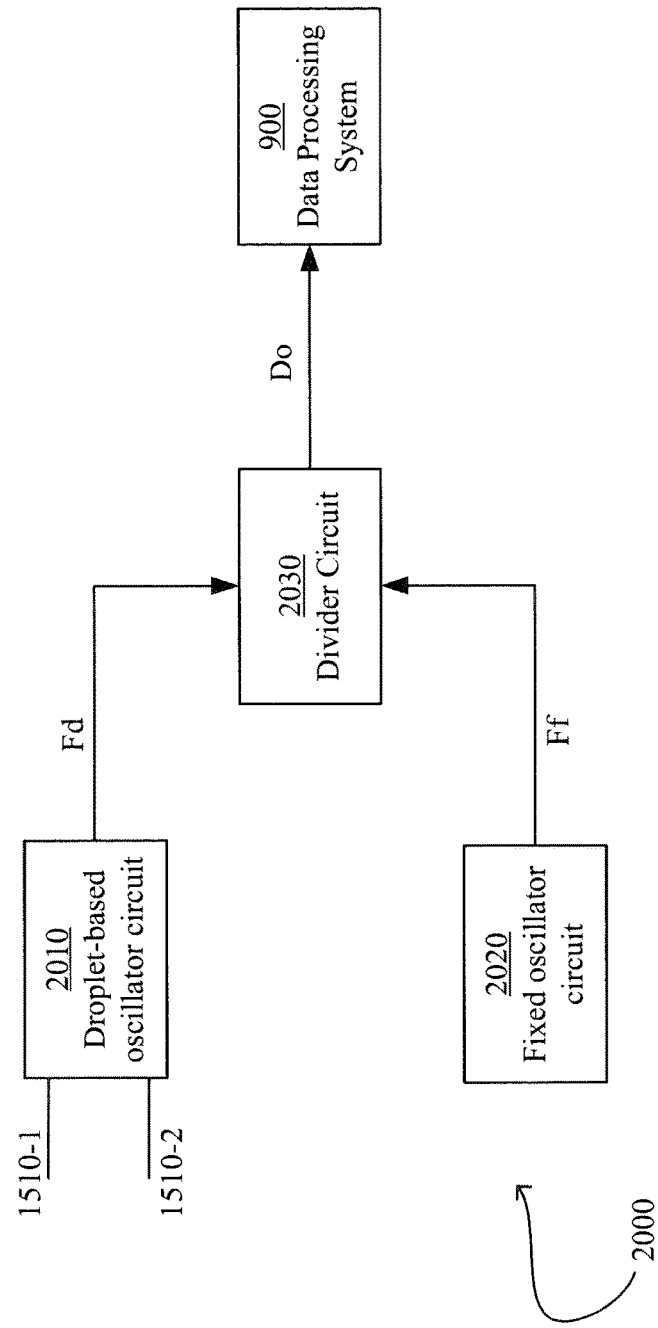
FIG. 20 schematically illustrates another embodiment of a droplet counter circuit.

Alternative droplet counter circuits 1900, 2000 are illustrated in FIGS. 19, 20 respectively. Each droplet counter circuit is preferably in electrical contact with the electrical contacts 1510-1, 1510-2 of the droplet counter 1500; each circuit is preferably not dependent on the number or configuration of electrical contacts such that more than two electrical contacts may be incorporated in the droplet counter and the droplet counter may be any droplet counter configured to engage a droplet and modify an operating state (e.g., electrical operating state such as resistance) upon engaging the droplet. In other embodiments, the employed droplet counter circuit may be in contact with a plurality of droplet counters for evaluating droplets engaging each of the plurality of droplet counters. The droplet counter circuit preferably generates a precipitation signal representative of precipitation information (e.g., number of droplets, size of droplets, droplet qualities) upon engagement of a droplet by the associated one or more droplet counters. The droplet counter circuit preferably transmits the precipitation signal for processing, e.g., to the hardware 150, to the processor 404 or 2900 and/or the system 130 or weather system 3102. The transmission may be electrical, wireless, and/or electronic and may include transfer via the network (e.g., 109, 180).

Referring to FIG. 19, a (preferably analog) droplet counter circuit 1900 preferably includes a droplet counter subcircuit 1910 having an output DCo which is preferably higher when the electrical contacts 1510-1, 1510-2 are electrically connected (e.g., by a droplet) and preferably lower when the electrical contacts are not electrically connected. The output DCo is preferably transmitted to a comparator circuit 1920 and used to generate an output CCo which is preferably a high value (e.g., a first logic value, a first voltage level) whenever the output DCo is less than a reference voltage and is preferably a low value (e.g., a second logic value, a second voltage level) whenever the output DCo is greater than a reference voltage. The comparator circuit preferably comprises a plurality of (e.g., 2) low-power operational amplifiers, e.g., operational amplifiers operating on a relatively low current (e.g., less than 20 microamperes) such as model no. MCP606 available from Microchip Technology Inc. in Chandler, Ariz. The output CCo is preferably received by a data processing system 900 (e.g., 130, 400, 3102, 2900, etc.), which preferably adds to the droplet count each time the output CCo switches from its low value to its high value.

Referring to FIG. 20, a (preferably digital) droplet counter circuit 2000 preferably includes a droplet-based oscillator circuit 2010 having a frequency Fd that is preferably a function of the resistance between the electrical contacts 1510-1, 1510-2 such that the frequency Fd is greater when a droplet electrically connects the contacts than when no droplet is present between the contacts. The droplet counter circuit 2000 preferably includes a fixed oscillator circuit 2020 having a constant frequency Ff. The frequency Fd is preferably greater (e.g., at least three times greater) than the frequency Ff when a droplet electrically connects the electrical contacts 1510-1, 1510-2 and may be less than the frequency Ff when a droplet is not present between the contacts. The circuits 2010, 2020 preferably comprise low power (e.g., less than 4 microamperes) Schmitt triggers.

Continuing to refer to FIG. 20, a divider circuit 2030 preferably compares the frequencies Ff, Fd and preferably generates an output signal Do based on the frequency comparison and communicates the signal Do to the data processing system 900. The divider circuit 2030 preferably comprises a plurality of (e.g., 2) flip flops. Passage of a droplet through the electrical contacts 1510-1, 1510-2 preferably generates a droplet pulse in the output signal Do having a pulse period and comprising a plurality of sub-pulses. The length of the pulse period is preferably directly related to the size of the droplet. The number of sub-pulses in the droplet pulse is preferably directly related to the conductivity of the droplet.

The weighing housing is preferably supported by a weighing device 1060 (e.g., a load cell). The weight of one or more of the weighing housing 1020, the filtration housing 1010 and the upper collection housing 1003 is preferably partially or entirely supported by the weighing device 1060. In some embodiments, the upper collection housing 1003 is slidingly supported by an annular rim such that vertical forces on the upper collection housing are not transmitted (or not substantially transmitted) to the housing 1005 while the upper collection housing is in its normal operating range of vertical positions (e.g., while the net downward vertical force acting on the upper collection area is within a threshold operational range such as 0 to 10 kilograms).

The weighing device 1060 is preferably in data communication (e.g., electrical, electronic or wireless communication) with a circuit board 1050. A switch 1052 (e.g., a momentary switch) is preferably in data communication with the circuit board 1050; the switch is preferably configured to modify an operating state of the circuit board (e.g., reset, power cycle, power off, power on). A power source (e.g., one or more batteries) is preferably housed in battery housing 1056 (accessible via removable lid 1058) and in power communication with one or more of circuit board 1050, the switch 1052, and the weighing device 1060.

Soil Characteristic Sensor Embodiments

Soil characteristic sensors may additionally be in data communication with the network (e.g., 109, 180) and the system (e.g., 130, 400, 3102, 2900, etc.). The soil characteristic sensors may comprise machine-mounted sensors or stationary sensors configured to measure soil characteristics such as soil moisture, soil temperature, soil electrical conductivity or soil or nutrient components (e.g., nitrogen, phosphorous, potassium, organic matter), such as described in U.S. Pat. Nos. 7,803,946 and 8,841,460 and U.S. patent application Ser. Nos. 14/489,195 and 14/760,696, hereby incorporated herein by reference.

Figure 21:
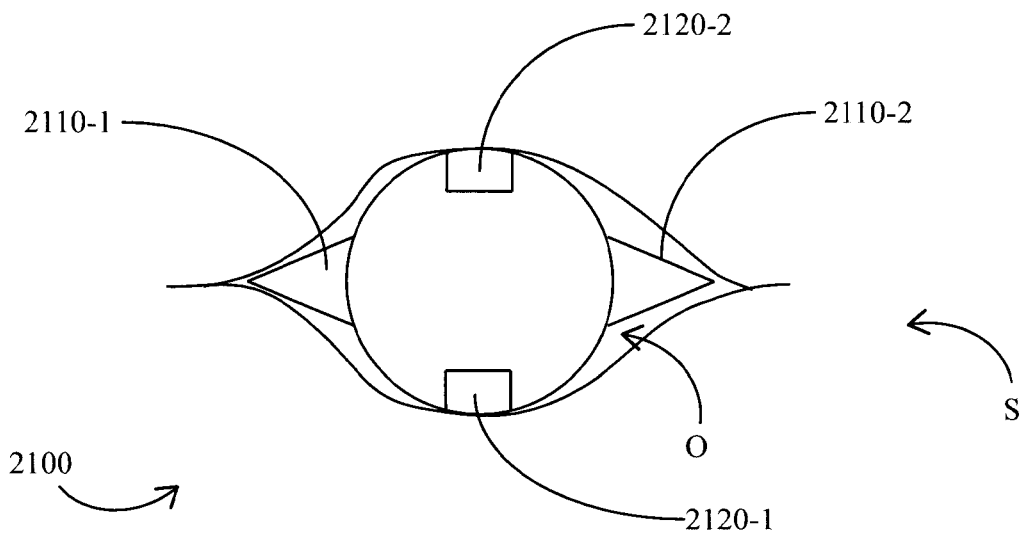
FIG. 21 is a plain view of an embodiment of a soil characteristic sensor inserted in the ground.

One embodiment of a soil characteristic sensor 2100 is illustrated in FIG. 21. The soil characteristic sensor 2100 is preferably inserted in the soil surface S, forming an opening O in the soil. The soil characteristic sensor 2100 preferably includes a plurality of sensing elements 2120 disposed to contact the soil along the sidewalls of the opening O. Soil cracking elements 2110 preferably create a crack in the soil along a first direction parallel to the sensing elements such that stress in the soil causes movement of the soil sidewalls in a direction parallel to the sensing elements rather than moving away from the sensing elements.

Figure 22:
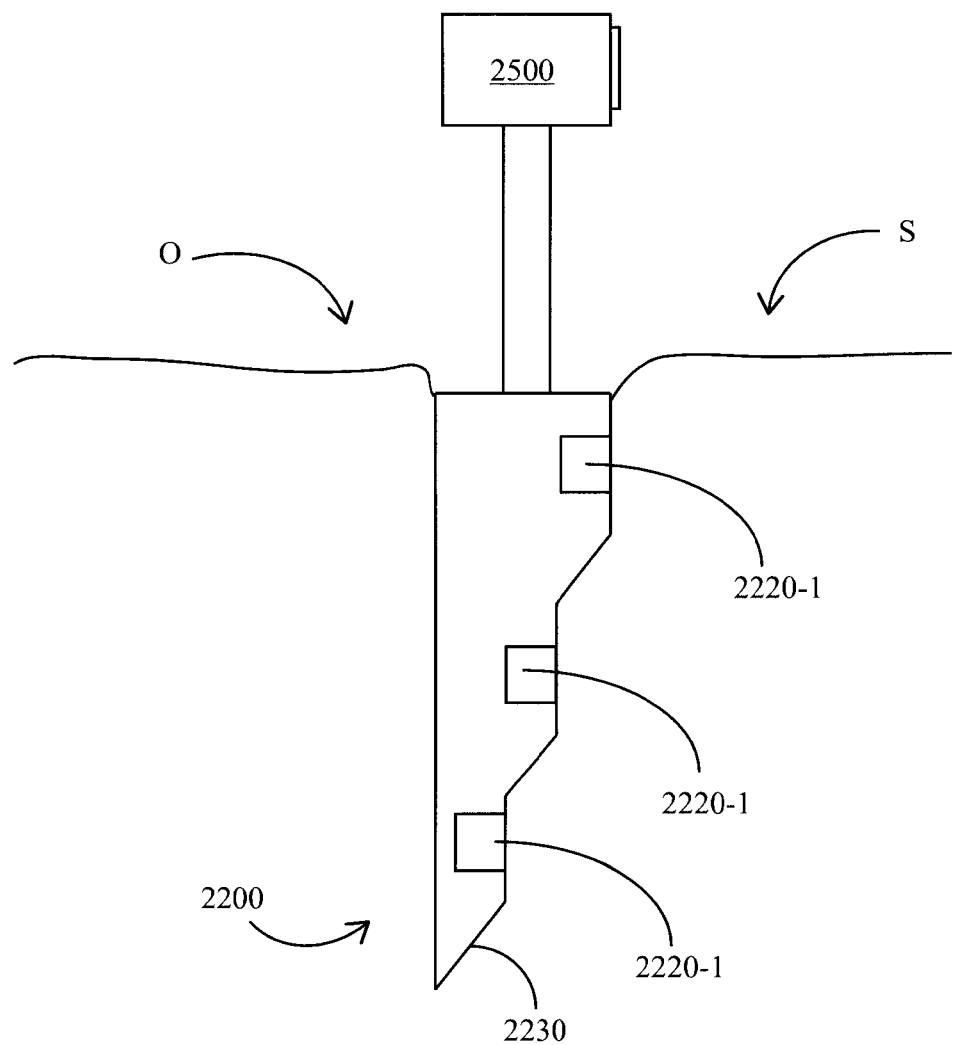
FIG. 22 is a cutaway side elevation view of another embodiment of a soil characteristic sensor inserted in the ground.

Another embodiment of a soil characteristic sensor 2200 is illustrated in FIG. 22. The soil characteristic sensor 2200 preferably includes a plurality of chamfers 2230 such that a width of the sensor narrows along the height of the sensor (and along the depth of the opening O). Thus as the sensor is inserted in the soil, soil-to-sensor contact between the soil sidewalls and sensing elements 2220 is improved.

In some embodiments, a camera may be mounted to and/or in data communication with the soil characteristic sensor and the system (e.g., 130, 400, 3102, 2900, etc.). The camera is preferably oriented to capture images of crops growing in the soil. In some implementations, the crop images may be analyzed to determine a crop growth stage of the crop, which may be reported to the system and used to determine, inter alia, nitrogen amounts required by the crop.

In some embodiments, the soil characteristic sensor may include a handle for quickly inserting and removing the soil characteristic sensor into the soil; such embodiments may be used to take successive soil measurements (e.g., nitrate measurements) in order to determine an optimal long-term (e.g., season-length) location for the soil characteristic sensor.

In some embodiments of the soil characteristic sensors described above, each sensing element may be paired with a soil-to-sensor contact indicator (e.g., a capacitive or optical sensor configured to generate a signal related to soil-to-sensor contact parameters such as the percentage of the sensor surface in contact with the soil and/or the amount of soil proximate to the sensor). The system (e.g., system 130, system 400, system 3102, system 2900, and/or a processor on the soil characteristic sensor) preferably receives the seed-to-soil sensor signal associated with each soil characteristic sensor and modifies a soil characteristic measurement based on said signals. In some embodiments, the system (e.g., system 130, system 400, system 3102, system 2900 and/or the processor on the soil characteristic sensor) may determine a sensor accuracy factor (e.g., a weighting factor between 0 and 1 which increases with estimated seed-to-soil contact) for each sensor and generate an estimated soil characteristic value by determining a weighted average of each soil characteristic sensor, where the weighted average is preferably determined by dividing the sum of the products of each soil characteristic sensor signal value and the associated sensor accuracy factor by the sum of each soil characteristic sensor signal value.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus for monitoring weather conditions for field operations, the apparatus comprising:
   a droplet former disposed to receive precipitation elements at an inlet and form droplets, the droplet former configured to guide the droplets to an outlet, the droplet former defining a funnel having a textured inner surface, wherein an upper portion of the textured inner surface defines a greater downward slope than a lower portion of the textured inner surface; and
   a droplet counter positioned to be vertically aligned with the outlet, the droplet counter configured to count droplets released by said outlet of the droplet former based on the droplets passing between first and second electrical contacts of the droplet counter.

2. The apparatus for monitoring weather conditions for field operations of claim 1, wherein the droplet former is configured to form the droplets and dispense the droplets to the droplet counter at a consistent velocity.

3. The apparatus for monitoring weather conditions for field operations of claim 1, wherein the textured inner surface of the droplet former is configured to reduce a statistical deviation of droplet size, shape, and velocity of the droplets, which are released at the outlet in comparison to a statistical deviation of size, shape, and velocity of precipitation elements which are received at the inlet.

4. The apparatus for monitoring weather conditions for field operations of claim 1, wherein the textured inner surface of the droplet former comprises regularly-spaced roughness elements which are arranged in a plurality of radially-spaced groupings disposed at a plurality of heights along the height of the inner surface.

5. The apparatus of claim 1, wherein the droplet counter includes:

a droplet counter circuit configured to generate an output signal in response to input signals from the first and second electrical contacts; and a comparator circuit coupled to the droplet counter circuit, the comparator circuit configured to compare the output signal of the droplet counter circuit to a reference voltage signal.

6. The apparatus of claim 5, wherein the comparator circuit is configured to generate an output signal in response to comparing the output signal of the droplet counter circuit to the reference voltage signal.

7. The apparatus of claim 6, wherein the output signal of the comparator circuit comprises a first value when the output signal of the droplet counter circuit is less than the reference voltage signal and a second value when the output signal of the droplet counter circuit is greater than the reference voltage signal.

8. The apparatus of claim 7, wherein the comparator circuit is configured to send the output signal to a data processing system that is communicatively coupled to the comparator circuit, the data processing system configured to increment a droplet count upon the output signal switching from the second value to the first value.

9. The apparatus of claim 1, wherein the textured inner surface defines a spiral ramp.

10. The apparatus of claim 9, wherein the spiral ramp includes the upper portion and the lower portion of the textured inner surface.

11. The apparatus of claim 10, wherein the upper portion of the textured inner surface includes multiple upper portions, and the lower portion of the textured inner surface includes multiple lower portions; and wherein a vertical spacing between vertically adjacent upper portions of the spiral ramp is greater than a vertical spacing between vertically adjacent lower portions.

12. A circuit for measuring precipitation, comprising:

a droplet-based oscillator circuit to generate a first frequency that is a function of resistance between first and second electrical contacts of a droplet counter;

a fixed-frequency oscillator circuit to generate a second frequency that is constant; and a divider circuit coupled to the droplet-based oscillator circuit and the fixed-frequency oscillator circuit, the divider circuit to generate an output signal based on a comparison of the first frequency and the second frequency.

13. The circuit for measuring precipitation of claim 12, wherein the first frequency is greater when a droplet electrically connects the first and second electrical contacts in comparison to when no droplet is present between the first and second electrical contacts.

14. The circuit for measuring precipitation of claim 13, wherein the first frequency is greater than the second frequency when a droplet electrically connects the first and second electrical contacts and the first frequency is less than the second frequency when no droplet is present between the first and second electrical contacts.

15. The circuit for measuring precipitation of claim 13, wherein the output signal comprises a droplet pulse having a pulse period and comprising a plurality of sub-pulses.

16. The circuit for measuring precipitation of claim 15, wherein the pulse period comprises a length that is related to a size of a droplet and a number of the plurality of sub-pulses relates to a conductivity of the droplet.

* * * * *